United States Patent
Saha et al.

(10) Patent No.: US 11,310,815 B2
(45) Date of Patent: Apr. 19, 2022

(54) WIRELESS DATA COMMUNICATION SERVICE OVER MULTIPLE UPLINKS

(71) Applicant: T-MOBILE INNOVATIONS LLC, Overland Park, KS (US)

(72) Inventors: Sougata Saha, Overland Park, KS (US); Anurag Thantharate, Kansas City, MO (US); Sreekar Marupaduga, Overland Park, KS (US); Kavitha Swaminathan, Olathe, KS (US); Nicholas John Baustert, Jr., Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/928,702

(22) Filed: Jul. 14, 2020

(65) Prior Publication Data
US 2022/0022218 A1 Jan. 20, 2022

(51) Int. Cl.
*H04W 72/12* (2009.01)
*H04W 52/14* (2009.01)
(Continued)

(52) U.S. Cl.
CPC ....... *H04W 72/1268* (2013.01); *H04W 52/14* (2013.01); *H04W 52/365* (2013.01); *H04W 52/42* (2013.01); *H04W 72/14* (2013.01)

(58) Field of Classification Search
CPC ............. H04W 72/12; H04W 72/1263; H04W 72/1268; H04W 72/14; H04W 52/365; H04W 52/42; H04W 52/14; H04W 52/146
See application file for complete search history.

(56) References Cited

U.S. PATENT DOCUMENTS 9,985,758 B2  5/2018 Takeda et al.
10,142,074 B2  11/2018 Wang et al.
(Continued)

FOREIGN PATENT DOCUMENTS

EP  3116259 A1  1/2017

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14);" Dec. 2019; pp. 1-110; 3GPP TS 36.321 V14.12.0; 3GPP; Valbonne, France.
(Continued)

*Primary Examiner* — Robert C Scheibel

(57) ABSTRACT

A primary wireless access node receives primary power headroom for User Equipment (UE). A secondary wireless access receives secondary power headroom for the UE and transfers the secondary power headroom to the primary wireless access node. The primary wireless access node compares the power primary headroom to the secondary power headroom to determine a primary uplink grant amount and a secondary uplink grant amount for the UE. The primary wireless access node grants primary uplink resources to the UE based on the primary uplink grant amount. The secondary wireless access node grants secondary uplink resources to the UE based on the secondary uplink grant amount. The wireless access nodes receive user data from the UE based on the uplink grant amounts.

20 Claims, 12 Drawing Sheets

(51) Int. Cl.
  *H04W 72/14* (2009.01)
  *H04W 52/42* (2009.01)
  *H04W 52/36* (2009.01)

(56) References Cited

U.S. PATENT DOCUMENTS

| | | |
|---|---|---|
| 10,200,991 B2 | 2/2019 | Dinan |
| 10,390,360 B2 | 8/2019 | Dinan |
| 10,560,889 B2 | 2/2020 | Takeda et al. |
| 10,673,601 B2 | 6/2020 | Chen et al. |
| 2015/0215943 A1* | 7/2015 | Vajapeyam ......... H04W 52/146 370/329 |
| 2015/0282104 A1* | 10/2015 | Damnjanovic ....... H04W 52/32 455/522 |
| 2016/0255537 A1 | 9/2016 | Uchino et al. |
| 2018/0206258 A1 | 7/2018 | Hosseini et al. |
| 2019/0215725 A1* | 7/2019 | Kim ................... H04W 28/065 |
| 2020/0213955 A1* | 7/2020 | Hosseini ............. H04L 5/0053 |
| 2020/0275391 A1* | 8/2020 | Guo .................... H04W 52/146 |
| 2021/0037481 A1* | 2/2021 | Kim .................... H04W 52/365 |
| 2021/0037482 A1* | 2/2021 | Shin ................. H04W 72/0413 |

OTHER PUBLICATIONS

"Power Headroom Reporting to Support UL Power Control in Dual Connectivity;" May 19-23, 2014; 3 pages; 3GPP TSG-RAN WG1 Meeting #86; 3GPP; Seoul, South Korea.

* cited by examiner

WIRELESS DATA COMMUNICATION SERVICE OVER MULTIPLE UPLINKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Millimeter-Wave (MMW), and Low-Power Wide Area Network (LP-WAN).

The wireless access nodes transfer user data to the wireless user devices over wireless downlinks. The wireless access nodes receive user data from the wireless user devices over wireless uplinks. In some wireless communication networks, multiple wireless access nodes simultaneously transfer user data to the same wireless user device over multiple wireless downlinks. Likewise, multiple wireless access nodes may simultaneously receive user data from the same wireless user device over multiple wireless uplinks. An Evolved Universal Terrestrial Radio Access Network New Radio Dual Connectivity (EN-DC) access node can simultaneously serve the same wireless user device over a wireless 5GNR uplink and a wireless LTE uplink.

The wireless access nodes control the transmit power of the wireless user devices. The wireless user devices have amplifiers that boost their wireless signal transmissions to desired power levels. The wireless access nodes transfer power instructions to the wireless user devices that indicate the desired power levels. The difference between the current transmit power level and the maximum amplifier transmit power level is called the power headroom. A wireless user device uses multiple amplifiers to simultaneously transmit signals to multiple wireless access nodes. Each amplifier in a wireless user device has power headroom for its the wireless access node. Unfortunately, the wireless user devices do not efficiently and effectively transmit over multiple wireless uplinks based on the power headroom for the wireless access nodes. Moreover, the wireless access nodes do not efficiently and effectively support simultaneous wireless uplinks based on power headroom.

TECHNICAL OVERVIEW

A primary wireless access node receives primary power headroom for User Equipment (UE). A secondary wireless access receives secondary power headroom for the UE and transfers the secondary power headroom to the primary wireless access node. The primary wireless access node compares the power primary headroom to the secondary power headroom to determine a primary uplink grant amount and a secondary uplink grant amount for the UE. The primary wireless access node grants primary uplink resources to the UE based on the primary uplink grant amount. The secondary wireless access node grants secondary uplink resources to the UE based on the secondary uplink grant amount. The wireless access nodes receive user data from the UE based on the uplink grants.

DETAILED DESCRIPTION

Figure 1:
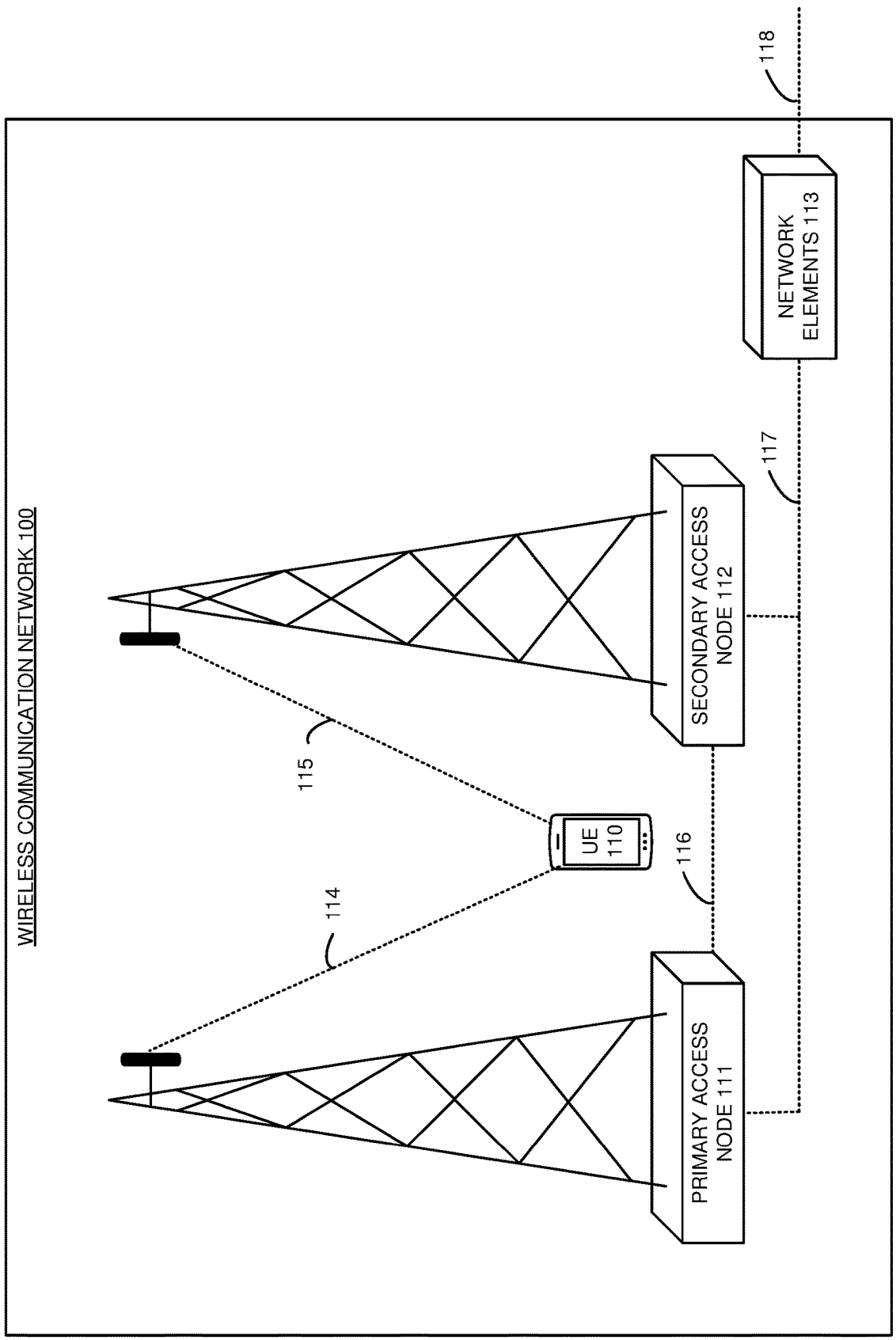
FIG. 1 illustrates a wireless communication network to serve User Equipment (UE) over multiple wireless uplinks.

FIG. 1 illustrates wireless communication network 100 to serve User Equipment (UE) 110 over multiple wireless uplinks 114-115. Wireless communication network 100 delivers wireless data services like video-calling, interactive-gaming, media-streaming, augmented-reality, machine-control, and/or some other wireless networking product. Wireless communication network 100 comprises wireless UE 110, primary access node 111, secondary access node 112, and network elements 113.

Various examples of network operation and configuration are described herein. In some examples, primary wireless access node 111 wirelessly receives primary power headroom for UE 110 on primary wireless access node 111. The primary power headroom comprises the difference between the current transmit power and the maximum transmit power for UE 110 when transmitting to primary wireless access node 111. Secondary wireless access node 112 wirelessly receives secondary power headroom for UE 110 on secondary wireless access node 112. Secondary wireless access node 112 transfers the secondary power headroom to primary wireless access node 111.

Primary wireless access node 111 compares the primary power headroom to the secondary power headroom. Primary wireless access node 111 determines a primary uplink grant amount and a secondary uplink grant amount for UE 110 based on the power headroom comparison. Primary wireless access node 111 transfers the secondary uplink grant amount to secondary wireless access node 112. Primary wireless access node 111 may use a data structure to translate the difference between the primary power headroom and the secondary power headroom into the primary uplink grant amount and the secondary uplink grant amount. The uplink grant amounts comprise uplink resources like transmit frequencies and time intervals.

Primary wireless access node 111 grants primary uplink resources like transmit frequencies and time intervals to UE 110 based on the primary uplink grant amount. Primary wireless access node 111 wirelessly receives user data from UE 110 using the primary uplink resources. Secondary wireless access node 112 grants secondary uplink resources like transmit frequencies and time intervals to UE 110 based on the secondary uplink grant amount. Secondary wireless access node 112 wirelessly receives user data from UE 110 using the secondary uplink resources. Thus, primary wireless access node 111 effectively and efficiently controls the uplink usage of wireless access nodes 111-112 based on power headroom to conserve UE power and to optimize wireless communication network 100. Primary wireless access node 111 may process other data to determine the primary and secondary uplink grants. For example, primary wireless access node 111 may compare the uplink usage and/or frequency band characteristics for access nodes 111-112 to determine the primary and secondary uplink grants in addition to or instead of the power headroom comparison.

UE 110 wirelessly communicates with primary access node 111 over wireless link 114 and with secondary access node 112 over wireless link 115. Wireless links 114-115 use wireless protocols like Institute of Electrical and Electronic Engineers (IEEE) 802.11 (WIFI), Long Term Evolution (LTE), Fifth Generation New Radio (5GNR), Millimeter-Wave (MMW), Low-Power Wide Area Network (LP-WAN), and/or some other protocol. Wireless links 114-115 use electromagnetic frequencies in the low-band, mid-band, high-band, or some other portion of the electromagnetic spectrum. Wireless access nodes 111-112 communicate with each over data links 116 and with network elements 113 over data links 117. Network elements 113 communicate with external systems like the internet over data links 118. Data links 116-118 use metal, glass, air, or some other media. Data links 116-1118 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UE 110 is depicted as a smartphone, UE 110 might instead comprise a computer, robot, vehicle, or some other data appliance with wireless communication circuitry. Wireless access nodes 111-112 are depicted as towers, but access nodes 111-112 may use other mounting structures or no mounting structure at all. Wireless access nodes 111-112 may comprise gNodeBs, eNodeBs, hot-spots, base-stations, and/or some other form of wireless network transceiver. Network elements 113 comprise Access and Mobility Management Functions (AMFs), User Plane Functions (UPFs), Mobility Management Entities (MMEs), Gateways (GWs), Internet-of-Things (IoT) application servers, content-delivery servers, and/or some other form of wireless network apparatus.

UE 110 and wireless access nodes 111-112 each comprise antennas, amplifiers, filters, modulation, analog/digital interfaces, microprocessors, software, memories, transceivers, bus circuitry, and the like. Network elements 113 each comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
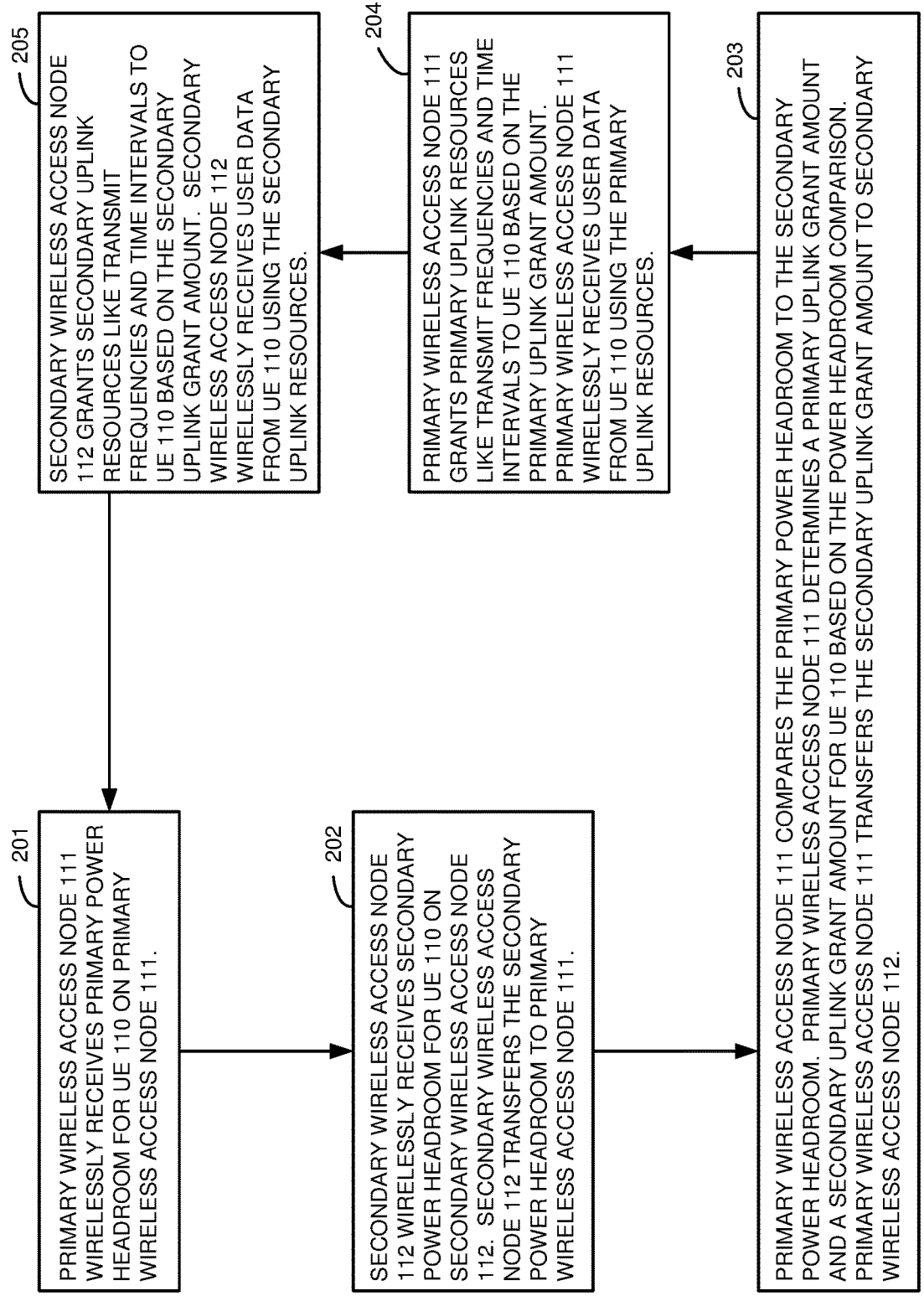
FIG. 2 illustrates an exemplary operation of the wireless communication network to serve the UE over the multiple wireless uplinks.

FIG. 2 illustrates exemplary operation of wireless communication network 100 to serve UE 110 over wireless uplinks 114-115. Primary wireless access node 111 wirelessly receives primary power headroom for UE 110 on primary wireless access node 111 (201). Secondary wireless access node 112 wirelessly receives secondary power headroom for UE 110 on secondary wireless access node 112 and transfers the secondary power headroom to primary wireless access node 111 (202). Primary wireless access node 111 compares the primary power headroom to the secondary power headroom (203). Primary wireless access node 111 determines a primary uplink grant amount and a secondary uplink grant amount for UE 110 based on the power headroom comparison (203). Primary wireless access node 111 transfers the secondary uplink grant amount to secondary wireless access node 112 (203). Primary wireless access node 111 grants primary uplink resources like transmit frequencies and time intervals to UE 110 based on the primary uplink grant amount (204). Primary wireless access node 111 wirelessly receives user data from UE 110 using the primary uplink resources (204). Secondary wireless access node 112 grants secondary uplink resources like transmit frequencies and time intervals to UE 110 based on the secondary uplink grant amount (205). Secondary wireless access node 112 wirelessly receives user data from UE 110 using the secondary uplink resources (205). The operation repeats (201).

Figure 3:
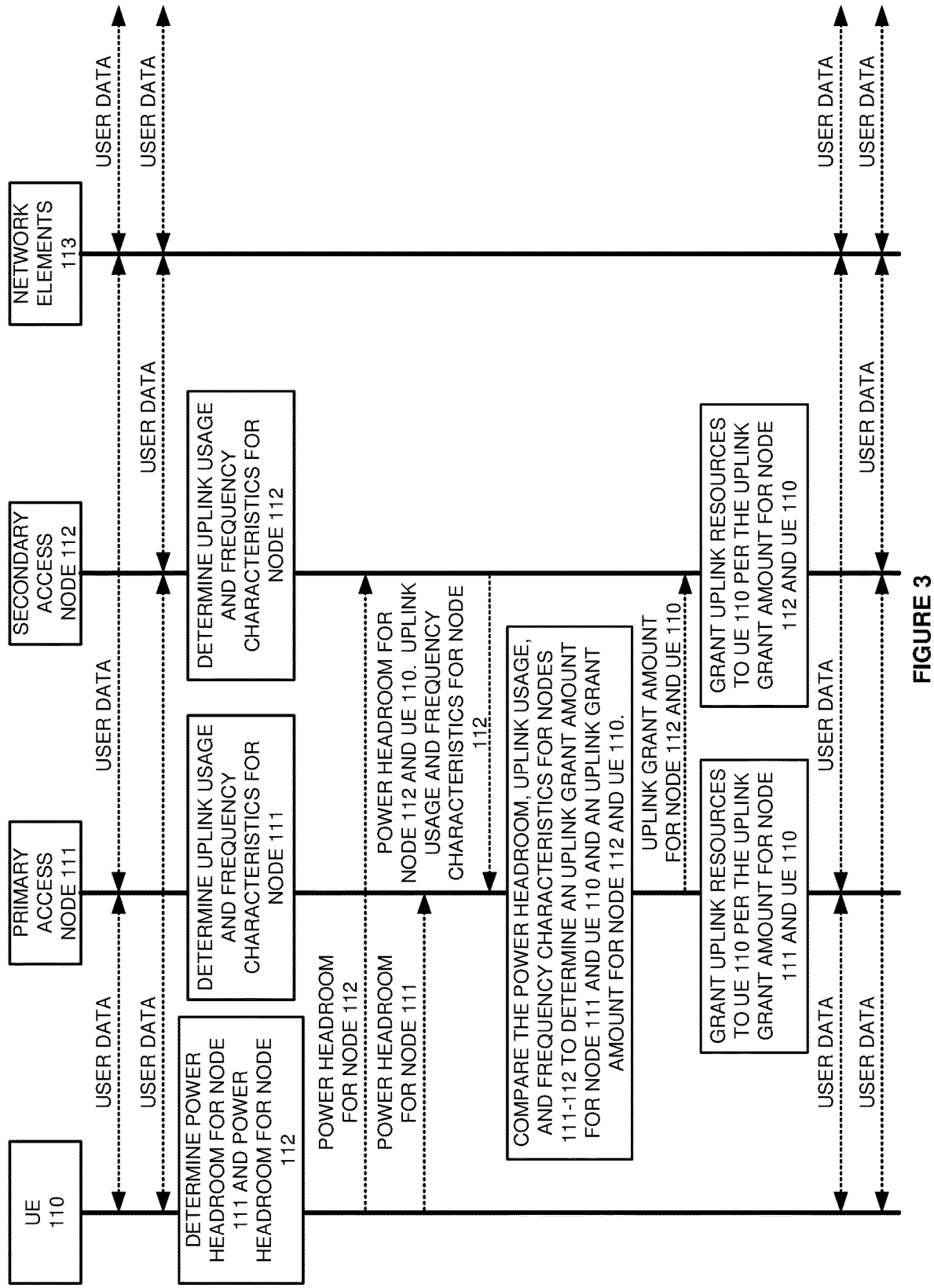
FIG. 3 illustrates an exemplary operation of the wireless communication network to serve the UE over the multiple wireless uplinks.

FIG. 3 illustrates an exemplary operation of wireless communication network 100 to serve UE 110 over wireless uplinks 114-115. In this example, uplink usage and frequency band are used in addition to power headroom to control the uplink split, although uplink usage and frequency band are not used in all examples. UE 110 and primary access node 111 wirelessly exchange user data over a frequency band that has characteristics like channel size, power level, and spectral efficiency. Primary access node 111 and network elements 113 exchange the user data, and network elements 113 and external systems exchange the user data. Primary access node 111 serves other UEs and has uplink usage that indicates the amount of UEs, uplink data, or the like that are currently handled by node 111. UE 110 and secondary access node 112 wirelessly exchange user data over another frequency band that has other characteristics. Secondary access node 112 and network elements 113 exchange the user data, and network elements 113 and the external systems exchange the user data. Secondary access node 112 also serves other UEs and has uplink usage that indicates the amount of UEs, uplink data, or the like that are currently handled by node 112.

Primary access node 111 determines its uplink usage and frequency band characteristics. Secondary access node 111 determines its uplink usage and frequency band characteristics and transfers this information to primary access node 111. UE 110 determines its power headroom for primary access node 111 and its power headroom for secondary access node 111. UE 110 transfers its power headroom for primary access node 111 to primary access node 111. UE 110 transfers its power headroom for secondary access node 112 to secondary access node 112. Secondary access node 112 transfers the power headroom for UE 110 and node 112 to primary access node 111. Secondary access node 112 also transfers its uplink usage and frequency characteristics to primary access node 111.

Primary access node 111 compares the power headroom for UE 110 and node 111 to the power headroom for UE 110 and node 112. Primary access node 111 compares the uplink usage and frequency characteristics for node 111 to the uplink usage and frequency characteristics for node 112. Based on the comparisons, primary access node 111 determines a primary uplink grant amount for UE 110 on node 111 and a secondary uplink grant amount for UE 110 on node 112 for a given time interval. Primary access node 111 transfers the secondary uplink grant amount for UE 110 and node 112 to secondary access node 112. Primary access node 111 grants uplink resources to UE 110 based on its uplink grant amount. UE 110 and primary access node 111 wirelessly exchange user data using the granted uplink resources for node 111 and UE 110. Secondary access node 112 grants uplink resources to UE 110 based the uplink grant amount from node 111. UE 110 and secondary access node 112 wirelessly exchange user data using the granted uplink resources for node 112 and UE 110.

Figure 4:
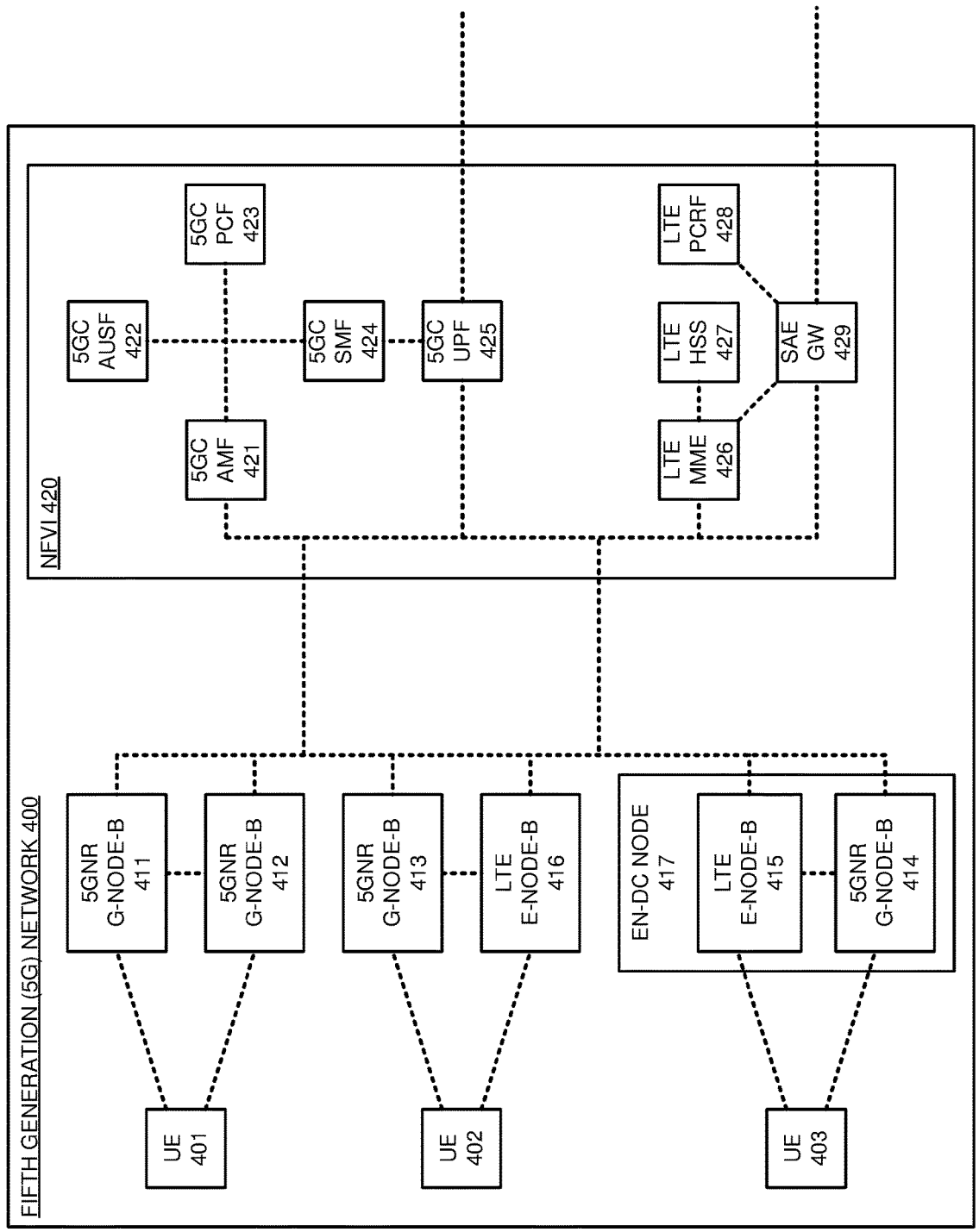
FIG. 4 illustrates a Fifth Generation (5G) wireless communication network to serve UEs over wireless 5G New Radio (5GNR) uplinks and wireless Long Term Evolution (LTE) uplinks.

FIG. 4 illustrates Fifth Generation (5G) wireless communication network 400 to serve UEs 401-403 over wireless 5G New Radio (5GNR) uplinks and wireless Long Term Evolution (LTE) uplinks. 5G wireless communication network 400 comprises an example of wireless communication network 100, although network 100 may differ. 5G wireless communication network 400 comprises UEs 401-403, 5GNR gNodeBs 411-414, LTE eNodeBs 415-416, and Network Function Virtualization Infrastructure (NFVI) 420. 5GNR gNodeBs 414 and LTE eNodeB 415 comprise Evolved Universal Terrestrial Radio Access Network New Radio Dual Connectivity (EN-DC) access node 417. NFVI 420 comprises Fifth Generation Core (5GC) Access and Mobility Management Functions (AMF) 421, 5GC Authentication and Security Functions (AUSF) 422, 5GC Policy Control Functions (PCF) 423, 5GC Session Management Functions (SMF) 424, 5GC User Plane Functions (UPF) 425, LTE Mobility Management Entities (MME) 426, LTE Home Subscriber Systems (HSS) 427, LTE Policy Charging and Rules Functions (PCRF) 428, and LTE Service Architecture Evolution Gateways (SAE GWs) 429.

In a first example, UE 401 wirelessly attaches to 5GNR gNodeB 411. 5GNR gNodeB 411 transfers N2 signaling for UE 401 to 5GC AMF 421. 5GC AMF 421 interacts with 5GC AUSF 422 and UE 401 to authenticate and authorize UE 401 for wireless data services. 5GC AMF 421 interacts with 5GC PCF 423 and 5GC SMF 424 select services, QoS, network addresses, dual-connectivity instructions, and the like to serve UE 401 over 5GNR gNodeB 411. 5GC AMF 421 transfers the N2 signaling to 5GNR gNodeB 411 that indicates service IDs, QoS, network addresses, dual-connectivity instructions, and the like. 5GC SMF 424 signals the service IDs, QoS, network addresses to 5GC UPF 425. 5GNR gNodeB 411 transfers the service IDs, QoS, network addresses, dual-connectivity instructions, and the like to UE 401. UE 401 reports the signal strength of 5GNR gNodeB 412 to 5GNR gNodeB 411, and in response to the dual-connectivity instructions and the signal strength, 5GNR gNodeB 411 directs UE 401 to attach to 5GNR gNodeB 412. 5GNR gNodeB 412 transfers N2 signaling for UE 401 to 5GC AMF 421 indicating the attachment. 5GC AMF 421 signals 5GC SMF 424 of the attachment, and in response, SMF directs UPF 425 to serve UE 401 over 5GNR gNodeB 412. UE 401 exchanges user data with external systems over 5GNR gNodeBs 411-412 and UPF 425. 5GNR gNodeBs 411-412 use different frequency bands that have different characteristics like channel sizes, power levels, and spectral efficiencies.

5GNR gNodeB 411 serves other UEs and has an uplink usage that comprises the amount of these UEs (plus UE 401), their uplink data, uplink interference, and/or the like for gNodeB 411. 5GNR gNodeB 411 determines its frequency band characteristics and uplink usage. 5GNR gNodeB 412 serves other UEs and has its own an uplink usage. 5GNR gNodeB 412 also determines its own frequency band characteristics and uplink usage. UE 401 determines its power headroom for 5GNR gNodeB 411 and its power headroom for 5GNR gNodeB 412. UE 401 transfers its power headroom for 5GNR NodeB 411 to gNodeB 411. UE 401 transfers its power headroom for 5GNR NodeB 412 to gNodeB 412. 5GNR gNodeB 412 transfers the power headroom for UE 401 and gNodeB 412 to 5GNR gNodeB 411. 5GNR gNodeB 412 also transfers its uplink usage and frequency characteristics to 5GNR gNodeB 411. 5GNR gNodeB 411 compares the power headroom for UE 401 and gNodeB 411 to the power headroom for UE 401 and gNodeB 412. 5GNR gNodeB 411 compares the uplink usage and frequency characteristics for gNodeB 411 to the uplink usage and frequency characteristics for 5GNR gNodeB 412.

Based on the comparisons, 5GNR gNodeB 411 determines a first amount of uplink data units for UE 401 over gNodeB 411 and a second amount of uplink data units for the UE 401 over gNodeB 412. 5GNR gNodeB 411 applies the percentages to the total number of data units that are required to serve UE 401 per the selected services and QoS over the time interval to determine a number of uplink data units for gNodeB 411 to handle during the time interval and a number of uplink data units for gNodeB 412 to handle during the time interval. 5GNR gNodeB 411 transfers the number of uplink data units for UE 401 during the time interval to gNodeB 412. 5GNR gNodeB 411 grants uplink resources to UE 401 based on its number of uplink data units. 5GNR gNodeB 412 grants uplink resources to UE 401 based on its number of uplink data units. UE 401 exchanges user data with external systems over 5GNR gNodeBs 411-412 and UPF 425. Advantageously, UE 401 transfers uplink data per a split based on comparative power headroom, uplink usage, and frequency band.

In a second example, UE 402 wirelessly attaches to 5GNR gNodeB 413. 5GNR gNodeB 413 transfers N2 signaling for UE 402 to 5GC AMF 421. 5GC AMF 421 interacts with 5GC AUSF 422 and UE 402 to authenticate and authorize UE 402 for wireless data services. 5GC AMF 421 interacts with 5GC PCF 423 and 5GC SMF 424 select services, QoS, network addresses, dual-connectivity instructions, and the like to serve UE 402 over 5GNR gNodeB 413. 5GC AMF 421 transfers the N2 signaling to 5GNR gNodeB 413 that indicates service IDs, QoS, network addresses, dual-connectivity instructions, and the like. 5GC SMF 424 signals the service IDs, QoS, network addresses to 5GC UPF 425. 5GNR gNodeB 413 transfers the service IDs, QoS, network addresses, dual-connectivity instructions, and the like to UE 402. UE 402 reports the signal strength of LTE eNodeB 416 to 5GNR gNodeB 413, and in response to the dual-connectivity instructions and the signal strength, 5GNR gNodeB 413 directs UE 402 to attach to LTE eNodeB 416. LTE eNodeB 416 indicates the LTE attachment of UE 402 to 5GNR gNodeB 413 which notifies AMF 421. AMF 421 directs UPF 425 to serve UE 402 over LTE eNodeB 416. UE 402 exchanges user data with external systems over 5GNR gNodeB 413, LTE eNodeB 416, and UPF 425. 5GNR gNodeB 413 and LTE eNodeB 416 use different frequency bands that have different characteristics like channel size, power level, and spectral efficiency.

5GNR gNodeB 413 serves other UEs and has an uplink usage that comprises the amount of these UEs (plus UE 402), their uplink data, uplink interference, and/or the like for gNodeB 413. 5GNR gNodeB 413 determines its frequency band characteristics and uplink usage. LTE eNodeB 416 serves other UEs and has its own an uplink usage. LTE eNodeB 416 also determines its own frequency band characteristics and uplink usage. UE 402 determines its power headroom for 5GNR gNodeB 413 and its power headroom for LTE eNodeB 416. UE 402 transfers its power headroom for 5GNR NodeB 413 to gNodeB 413. UE 402 transfers its power headroom for LTE eNodeB 416 to eNodeB 416. LTE eNodeB 416 transfers the power headroom for UE 402 and eNodeB 416 to gNodeB 413. LTE eNodeB 416 also transfers its uplink usage and frequency characteristics to 5GNR gNodeB 413. 5GNR gNodeB 413 compares the power headroom for UE 402 and gNodeB 413 to the power headroom for UE 402 and eNodeB 416. 5GNR gNodeB 413 compares the uplink usage and frequency characteristics for gNodeB 413 to the uplink usage and frequency characteristics for LTE eNodeB 416.

Based on the comparisons, 5GNR gNodeB 413 determines a first amount of uplink data units for the UE 402 over gNodeB 413 and a second amount of uplink data units for UE 402 over eNodeB 416. 5GNR gNodeB 413 applies the percentages to the total number of data units that are required to serve UE 402 per the selected services and QoS over a time interval to determine a number of uplink data units for gNodeB 413 to handle during the time interval and a number of uplink data units for eNodeB 416 to handle during the time interval. 5GNR gNodeB 413 transfers the number of uplink data units for UE 402 and eNodeB 416 during the time interval to eNodeB 416. 5GNR gNodeB 413 grants uplink resources to UE 402 based on its number of uplink data units. LTE eNodeB 416 grants uplink resources to UE 402 based on its number of uplink data units. UE 402 exchanges user data with external systems over 5GNR gNodeB 413, LTE eNodeB 416, and UPF 425. Advantageously, UE 402 transfers the uplink data per a split based comparative power headroom, uplink usage, and frequency band.

In a third example, UE 403 wirelessly attaches to LTE eNodeB 415 in EN-DC node 417 and indicates its 5GNR capability. LTE eNodeB 415 transfers S1-MME signaling for UE 403 to LTE MME 426 that indicates the 5GNR capability. LTE MME 426 interacts with LTE HSS 427 and UE 403 to authenticate and authorize UE 403 for wireless data services. LTE MME 426 interacts with SAE GW 429 which interacts with PCRF 428 to select services, Quality-of-Service (QoS), network addresses, 5GNR instructions, and the like to serve UE 403 over LTE eNodeB 415. LTE MME 426 transfers S1-MME signaling to LTE eNodeB 415 that indicates service IDs, QoS, network addresses, 5GNR instructions, and the like. LTE MME 426 signals the service IDs, QoS, network addresses, and the like to SAE GW 429. LTE eNodeB 415 transfers the service IDs, QoS, network addresses, 5GNR instructions, and the like to UE 403.

In response to the 5GNR instructions, UE 403 measures and reports the signal strength of 5GNR gNodeB 414 to LTE eNodeB 415. In response to the S1-MME signaling from MME 426 and the reported signal strength, LTE eNodeB 415 directs UE 403 to attach to 5GNR gNodeB 414. UE 403 attaches to 5GNR gNodeB 414, and gNodeB 414 transfers X2 signaling to LTE eNodeB 415 indicating the attachment of UE 403. LTE eNodeB 415 transfers S1-MME signaling to MME 426 indicating the 5GNR attachment of UE 403. MME 426 directs SAE GW 429 to serve UE 403 over 5GNR gNodeB 414. UE 403 exchanges user data with external systems over 5GNR gNodeB 414, LTE eNodeB 415, and SAE GW 429. 5GNR gNodeB 414 and LTE eNodeB 415 use different frequency bands that have different characteristics like channel size, power level, and spectral efficiency.

LTE eNodeB 415 serves other UEs and has an uplink usage that comprises the amount of these UEs (plus UE 403), their uplink data, uplink interference, and/or the like for eNodeB 415. LTE eNodeB 415 determines its frequency band characteristics and uplink usage. 5GNR gNodeB 414 serves other UEs (plus UE 403) and has its own an uplink usage. 5GNR gNodeB 414 determines its own frequency band characteristics and uplink usage. UE 403 determines its power headroom for LTE eNodeB 415 and its power headroom for 5GNR gNodeB 414. UE 403 transfers its power headroom for LTE eNodeB 415 to eNodeB 415. UE 403 transfers its power headroom for 5GNR NodeB 414 to gNodeB 414. 5GNR gNodeB 414 transfers the power headroom for UE 403 and gNodeB 414 to LTE eNodeB 415. 5GNR gNodeB 414 also transfers its uplink usage and frequency characteristics to LTE eNodeB 415. LTE eNodeB 415 compares the power headroom for UE 403 and gNodeB 414 to the power headroom for UE 403 and eNodeB 415. LTE eNodeB 415 compares the uplink usage and frequency characteristics for LTE eNodeB 415 to the uplink usage and frequency characteristics for 5GNR gNodeB 414.

Based on the comparisons, LTE eNodeB 415 determines a first amount of uplink data units for UE 403 over LTE eNodeB 415 and a second amount of uplink data units for the UE 401 over 5GNR gNodeB 414. The data units comprise blocks of data. In some examples, LTE eNodeB 415 enters a data structure with the frequency bands to yield a first branch, and then enters the first branch with the uplink usage difference to yield a second branch. The second branch is entered with the power headroom difference to yield data unit percentages for LTE eNodeB 415 and 5GNR gNodeB 414 like 50/50, 60/40, 30/70, and the like. LTE eNodeB 415 applies the percentages to the total number of data units that are required to serve UE 401 over a given time interval to yield the number of uplink data units for LTE eNodeB 415 during the time interval and the number of uplink data units for 5GNR gNodeB 414 during the time interval. LTE eNodeB 415 transfers the number of uplink data units for UE 403 and gNodeB 414 during the time interval to 5GNR gNodeB 414. LTE eNodeB 415 grants uplink resources to UE 403 based on its allocated number of uplink data units during the time interval. 5GNR gNodeB 414 grants uplink resources to UE 403 based on its allocated number of uplink data units during the time interval. UE 403 still exchanges user data with external systems over LTE eNodeB 415 and 5GNR gNodeB 414 and SAE GW 429. Advantageously, UE 403 transfers the uplink data per a split based comparative power headroom, uplink usage, and frequency band characteristics.

Figure 5:
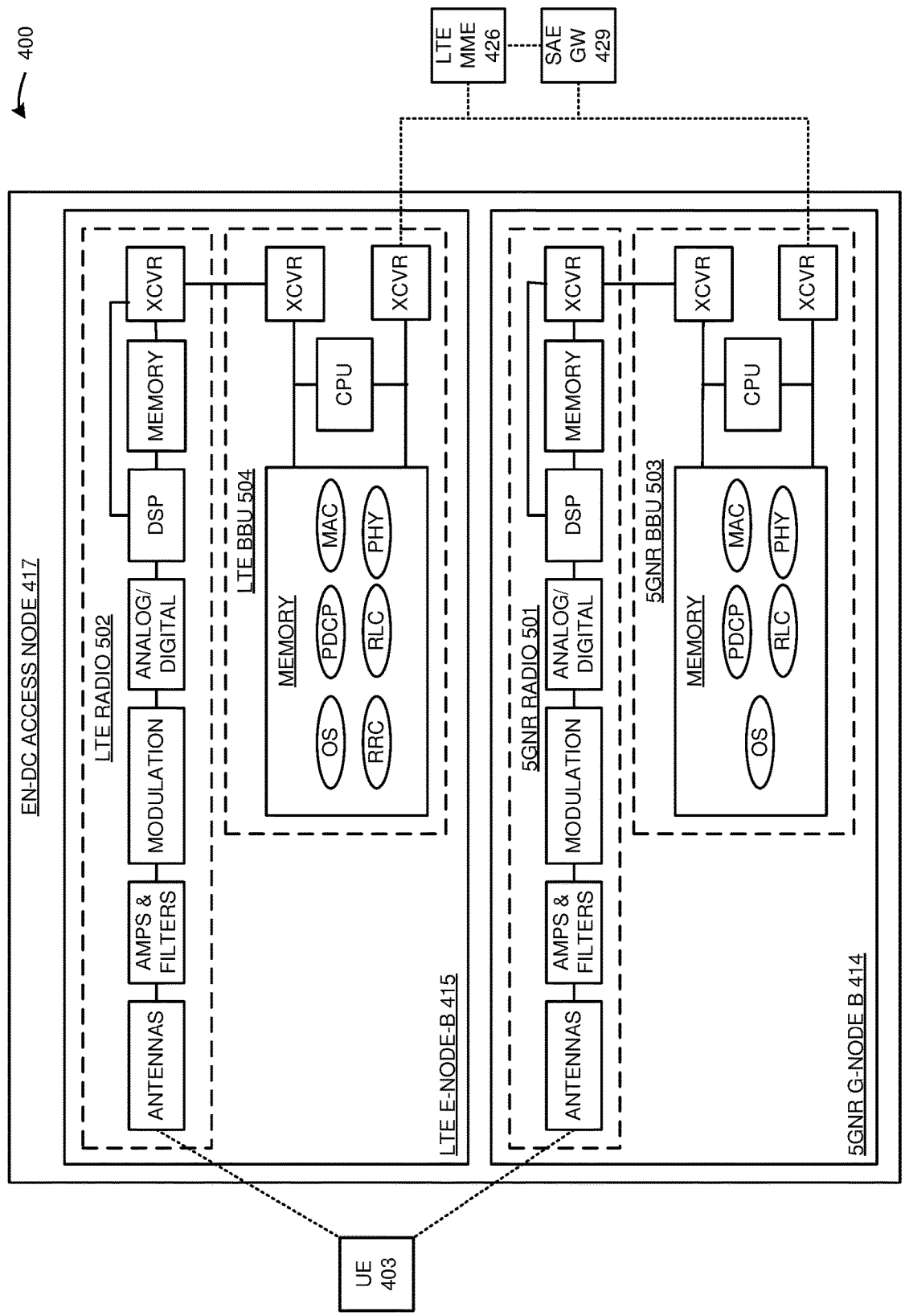
FIG. 5 illustrates an Evolved Universal Terrestrial Radio Access Network New Radio Dual Connectivity (EN-DC) access node to serve the UEs over wireless 5GNR uplinks and wireless LTE uplinks.

FIG. 5 illustrates Evolved Universal Terrestrial Radio Access Network New Radio Dual Connectivity (EN-DC) access node 417 to serve UE 403 over wireless 5GNR uplinks and wireless LTE uplinks. EN-DC node 417 is an example of access nodes 111-112, although nodes 111-112 may differ. EN-DC node 417 comprises 5GNR gNodeB 414 and LTE eNodeB 415. 5GNR gNodeB 414 comprises 5GNR radio 501 and 5GNR BBU 503. LTE eNodeB 415 comprises LTE radio 502 and LTE BBU 504. Radios 501-502 comprise antennas, amplifiers, filters, modulation, analog-to-digital interfaces, DSP, memory, and transceivers that are coupled over bus circuitry. BBUs 503-504 comprises memory, CPU, and transceivers that are coupled over bus circuitry. The memories in BBUs 503-504 store operating systems and network applications like Physical Layer (PHY), Media Access Control (MAC), Radio Link Control (RLC), Packet Data Control Protocol (PDCP), and Radio Resource Control (RRC). The CPU in BBUs 503-504 execute the operating systems, PHYs, MACs, RLCs, PDCPs, and RRCs to exchange network signaling and user data with UE 403 and exchange network signaling and user data with LTE MME 426 and SAE GW 429. UE 403 is wirelessly coupled to the antennas in 5GNR radio 501 over 5GNR links and to the antennas in LTE radio 502 over LTE links. A transceiver in 5GNR radio 501 is coupled to a transceiver in 5GNR BBU 503 over CPRI links. A transceiver in LTE radio 502 is coupled to a transceiver in LTE BBU 504 over CPRI links. A transceiver in 5GNR BBU 503 is coupled to a transceiver in LTE BBU 504 over X2 links. A transceiver in 5GNR BBU 503 is coupled to SAE GW 429 over backhaul links. A transceiver in LTE BBU 504 is coupled to MME 426 and to SAE GW 429 over backhaul links.

In LTE radio 502, the antennas receive wireless LTE signals from UE 403 that transport UL LTE signaling and UL LTE data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The LTE RRC processes the UL LTE signaling, UL X2 signaling from the PDCP in gNodeB 414, and DL S1-MME signaling from MME 426 to generate new DL LTE signaling, new DL X2 signaling, and new UL S1-MME signaling. The LTE RRC transfers the new DL LTE signaling to UE 403 over LTE radio 502. The LTE RRC transfers the new DL X2 signaling to the 5GNR PDCP in 5GNR gNodeB 414. The LTE PDCP transfers corresponding UL S1-U data to SAE GW 429.

In LTE BBU 504, the LTE RRC receives the DL S1-MME signaling from MME 426 and the LTE PDCP receives DL S1-U data from SAE GW 429. The LTE network applications process the new DL LTE signaling and the DL S1-U data to generate corresponding DL LTE symbols that carry the DL LTE signaling and DL LTE data. In LTE radio 502, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals to UE 403 that transport the DL LTE signaling and DL LTE data.

In 5GNR radio 501, the antennas receive wireless 5GNR signals from UE 403 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE eNodeB 414 to generate new UL X2 signaling and new DL 5GNR signaling. The 5GNR PDCP transfers the new UL X2 signaling to the LTE RRC in LTE BBU 504. The 5GNR PDCP transfers corresponding UL S1-U data to SAE GW 429.

In 5GNR BBU 504, the 5GNR PDCP receives the DL X2 signaling from the LTE RRC in LTE BBU 504. The 5GNR PDCP receives DL S1-U data from SAE GW 429. The 5GNR network applications process the new DL 5GNR signaling and the DL S1-U data to generate DL 5GNR symbols that carry the DL 5GNR signaling and corresponding DL 5GNR data. In 5GNR radio 501, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals to UE 403 that transport the DL 5GNR signaling and DL 5GNR data.

RRC functions comprise authentication, security, handover control, status reporting, Quality-of-Service (QoS), network broadcasts and pages, and network selection. SDAP functions include packet marking and QoS enforcement. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In operation, UE 403 wirelessly attaches to LTE BBU 504 over LTE radio 502 and indicates its 5GNR capability. LTE BBU 504 transfers S1-MME signaling for UE 403 to LTE MME 426 indicating the 5GNR capability. LTE BBU 504 receives service IDs, QoS, network addresses, 5GNR instructions, and the like for UE 403. LTE BBU 504 transfers the service IDs, QoS, network addresses, 5GNR instructions, and the like to UE 403 over LTE radio 502. LTE BBU 504 receives a signal strength report for 5GNR gNodeB 414 from UE 403 over LTE radio 502. In response to the 5GNR instructions and the reported signal strength, LTE BBU 504 signals UE 403 over radio 502 to attach to 5GNR gNodeB 414. UE 403 attaches to 5GNR BBU 503 in 5GNR gNodeB 414 over 5GNR radio 501. 5GNR BBU 403 transfers X2 signaling to LTE BBU 504 indicating the 5GNR attachment of UE 403. LTE BBU 504 transfers S1-MME signaling to LTE MME 426 indicating the 5GNR attachment of UE 403. LTE MME 426 directs SAE GW 429 to serve UE 403 over 5GNR BBU 504. UE 403 exchanges user data with external systems over 5GNR gNodeB 414, LTE eNodeB 415, and SAE GW 429. LTE eNodeB 415 and 5GNR gNodeB 414 use different frequency bands that have different characteristics like channel size, power level, and spectral efficiency.

LTE eNodeB 415 serves other UEs and has an uplink usage that comprises the amount of these UEs (plus UE 403), their uplink data, uplink interference, and/or the like for LTE eNodeB 415. LTE BBU 504 determines its frequency band characteristics and uplink usage. 5GNR gNodeB 414 serves other UEs and has its own an uplink usage. 5GNR BBU 503 determines its own frequency band characteristics and uplink usage. UE 403 determines its power headroom for LTE eNodeB 415 and its power headroom for 5GNR gNodeB 414. UE 403 transfers its power headroom for LTE eNodeB 415 to LTE BBU 504. UE 403 transfers its power headroom for 5GNR NodeB 414 to 5GNR BBU 503. 5GNR BBU 503 transfers the power headroom for UE 403 and gNodeB 414 to LTE BBU 504. 5GNR BBU 503 also transfers its uplink usage and frequency characteristics to LTE BBU 504. LTE BBU 504 compares the power headroom for UE 403 and gNodeB 414 to the power headroom for UE 403 and eNodeB 415. LTE BBU 504 compares the uplink usage and frequency characteristics for LTE eNodeB 415 to the uplink usage and frequency characteristics for 5GNR gNodeB 414.

Based on the comparisons, LTE BBU 504 determines a first amount of uplink data units for UE 403 over LTE eNodeB 415 and a second amount of uplink data units for the UE 401 over 5GNR gNodeB 414. In some examples, LTE eNodeB 415 enters a data structure with the frequency bands to yield a first branch, and then enters the first branch with the difference in uplink usage to yield a second branch. The second branch is entered with the power headroom difference to yield data unit percentages for LTE eNodeB 415 and 5GNR gNodeB 414 like 50/50, 60/40, and 30/70. LTE BBU 504 applies the percentages to the total number of data units that are required to serve UE 401 for the selected services and QoS over a given time interval to determine a number of uplink data units for LTE eNodeB 415 during the time interval and a number of uplink data units for 5GNR gNodeB 414 during the time interval. LTE BBU 504 transfers the number of uplink data units during the time interval for UE 403 and 5GNR gNodeB 414 to 5GNR BBU 503. LTE BBU 504 grants uplink resources to UE 403 based on its allocated number of uplink data units. 5GNR BBU 503 grants uplink resources to UE 403 based on its allocated number of uplink data units. UE 403 exchanges user data with external systems over 5GNR gNodeB 414, LTE eNodeB 415, and SAE GW 429. Advantageously, UE 403 transfers the uplink data per a split based comparative power headroom, uplink usage, and frequency band characteristics.

Figure 6:
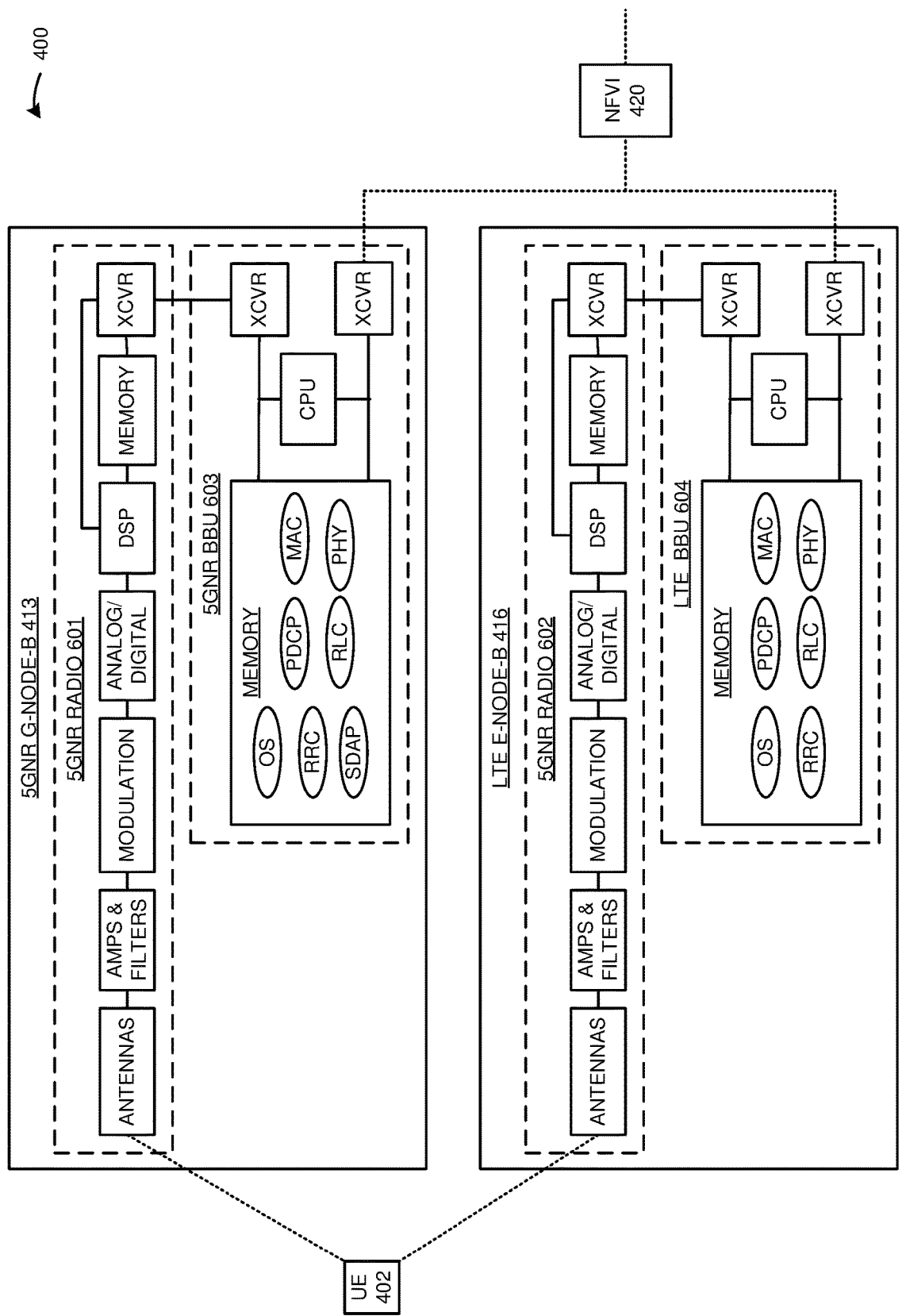
FIG. 6 illustrates a 5GNR gNodeB and an LTE eNodeB to serve the UEs over wireless 5GNR uplinks and wireless LTE uplinks.

FIG. 6 illustrates 5GNR gNodeB 413 and LTE eNodeB 416 to serve UE 402 over wireless 5GNR uplinks and wireless LTE uplinks. 5GNR gNodeB 413 and LTE eNodeB 416 comprise examples of wireless access nodes 111-112, although access nodes 111-112 may differ. 5GNR gNodeB 413 comprises 5GNR radio 601 and 5GNR BBU 603. LTE eNodeB 416 comprises LTE radio 602 and LTE BBU 604. Radios 601-602 comprises antennas, amplifiers, filters, modulation, analog-to-digital interfaces, DSP, memory, and transceivers that are coupled over bus circuitry. BBUs 603-604 comprises memory, CPU, and transceivers that are coupled over bus circuitry. The memories in BBUs 503-504 store operating systems and network applications like PHY, MAC, RLC, PDCP, RRC, and Service Data Adaptation Protocol (SDAP). The CPU in BBUs 603-604 execute the operating systems, PHYs, MACs, RLCs, PDCPs, SDAPs, and RRCs to exchange signaling and user data with UE 402 and to exchange signaling and user data with NFVI 420. UE 402 is wirelessly coupled to the antennas in 5GNR radio 601 over 5GNR links. UE 402 is wirelessly coupled to the antennas in LTE radio 602 over LTE links. A transceiver in 5GNR radio 601 is coupled to a transceiver in 5GNR BBU 603 over CPRI links. A transceiver in LTE radio 602 is coupled to a transceiver in LTE BBU 604 over CPRI links. A transceiver in 5GNR BBU 603 is coupled to AMF 421 and UPF 425 in NFVI 420. A transceiver in LTE BBU 604 is coupled to UPF 425 in NFVI 420.

In 5GNR radio 601, the antennas receive wireless 5GNR signals from UE 402 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC processes the UL 5GNR signaling and DL 5GC N2 signaling from AMF 421 to generate new UL 5GC N2 signaling and new DL 5GNR signaling. The 5GNR RRC transfers the new UL 5GC N2 signaling to AMF 421. The 5GNR SDAP transfers corresponding UL 5GC N3 data to UPF 423 over backhaul links.

In 5GNR BBU 502, the 5GNR RRC receives the 5GC DL N2 signaling from AMF 421. The 5GNR SDAP receives DL 5GNR N3 data from UPF 425. The 5GNR network applications process the new DL 5GNR signaling and the DL 5GNR data to generate corresponding DL 5GNR symbols that carry the DL 5GNR signaling and DL 5GNR data. In 5GNR radio 501, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals to UE 402 that transport the DL 5GNR signaling and DL 5GNR data.

In LTE radio 601, the antennas receive wireless LTE signals from UE 402 that transport UL LTE signaling and UL LTE data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The LTE PDCP processes the UL LTE signaling and DL X2 signaling from 5GNR BBU 603 to generate new UL X2 signaling and new DL LTE signaling. The LTE PDCP transfers the new UL X2 signaling to 5GNR BBU 603. The LTE PDCP transfers corresponding UL N3 user data to UPF 425.

In LTE BBU 604, the LTE PDCP receives the DL X2 signaling from 5GNR BBU 603. The LTE PDCP receives DL S1-U user data from UPF 425. The LTE network applications process the new DL LTE signaling and the DL S1-U data to generate corresponding DL LTE symbols that carry the DL LTE signaling and DL LTE data. In LTE radio 602, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals to UE 402 that transport the DL LTE signaling and DL data.

RRC functions comprise authentication, security, handover control, status reporting, QoS, network broadcasts and pages, and network selection. SDAP functions include packet marking and QoS enforcement. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In operation, UE 402 wirelessly attaches to 5GNR BBU 603 over 5GNR radio 601. 5GNR BBU 603 transfers N2 signaling for UE 402 to AMF 421 in NFVI 420. 5GNR BBU 603 receives N2 signaling from AMF 421 that indicates service IDs, QoS, network addresses, and the like. 5GNR BBU 603 transfers the service IDs, QoS, network addresses, and the like to UE 402 over radio 601. UE 402 reports the signal strength of LTE eNodeB 416 to 5GNR BBU 603, and in response to the N2 signaling from AMF 421 and the signal strength, 5GNR BBU 603 directs UE 402 to attach to LTE eNodeB 416. UE 402 wirelessly attaches to LTE BBU 604. LTE BBU 604 transfers X2 signaling for UE 403 to 5GNR BBU 603 indicating the attachment, and 5GNR BBU 603 notifies AMF 421 in NFVI 420.

5GNR BBU 603 receives service IDs, QoS, network addresses, and the like for UE 402 from AMF 421. LTE BBU 604 receives the service IDs, QoS, network addresses, and the like for UE 402 from 5GNR BBU 603. LTE BBU 604 transfers the service IDs, QoS, network addresses, and the like to UE 402 over LTE radio 602. UE 402 exchanges user data with external systems over 5GNR gNodeB 413, LTE eNodeB 416, and UPF 425 in NFVI 420. LTE eNodeB 416 and 5GNR gNodeB 413 use different frequency bands that have different characteristics like channel size, power level, and spectral efficiency.

5GNR gNodeB 413 serves other UEs and has an uplink usage that comprises the amount of these UEs (plus UE 402), their uplink data, uplink interference, and/or the like for gNodeB 413. 5GNR BBU 603 determines its frequency band characteristics and uplink usage. 5GNR BBU 603 serves other UEs and has its own an uplink usage. LTE eNodeB 416 serves other UEs and has an uplink usage that comprises the amount of these UEs (plus UE 402), their uplink data, uplink interference, and/or the like for eNodeB 416. LTE BBU 604 determines its frequency band characteristics and uplink usage. LTE BBU 604 transfers its frequency band characteristics and uplink usage to 5GNR BBU 603.

UE 402 determines its power headroom for 5GNR gNodeB 413 and its power headroom for LTE eNodeB 416. UE 402 transfers its power headroom for 5GNR NodeB 413 to 5GNR BBU 603. UE 402 transfers its power headroom for LTE eNodeB 416 to LTE BBU 604 which transfers the power headroom for UE 402 and eNodeB 416 to 5GNR BBU 603. 5GNR BBU 603 compares the power headroom for UE 402 and 5GNR gNodeB 413 to the power headroom for UE 402 and LTE eNodeB 416. 5GNR BBU 603 compares the uplink usage and frequency characteristics for 5GNR gNodeB 413 to the uplink usage and frequency characteristics for LTE eNodeB 413.

Based on the comparisons, 5GNR BBU 603 determines a first amount of uplink data units for the UE 402 over 5GNR gNodeB 413 and a second amount of uplink data units for the UE 402 over LTE eNodeB 416. To determine the amounts, 5GNR BBU 603 applies percentages to the total number of data units for UE 401 over a time interval to determine a number of uplink data units for 5GNR gNodeB 413 to handle during the time interval and a number of uplink data units for LTE eNodeB 416 to handle during the time interval. 5GNR BBU 603 transfers the number of uplink data units for UE 402 during the time interval to LTE BBU 604. 5GNR BBU 603 grants uplink resources to UE 402 based on its number of uplink data units. LTE BBU 604 grants uplink resources to UE 401 based on its number of uplink data units. UE 402 exchanges user data with external systems over 5GNR gNodeB 413, LTE eNodeB 416, and NFVI 420. Advantageously, UE 402 transfers uplink data per a split based on comparative power headroom, uplink usage, and frequency band.

Figure 7:
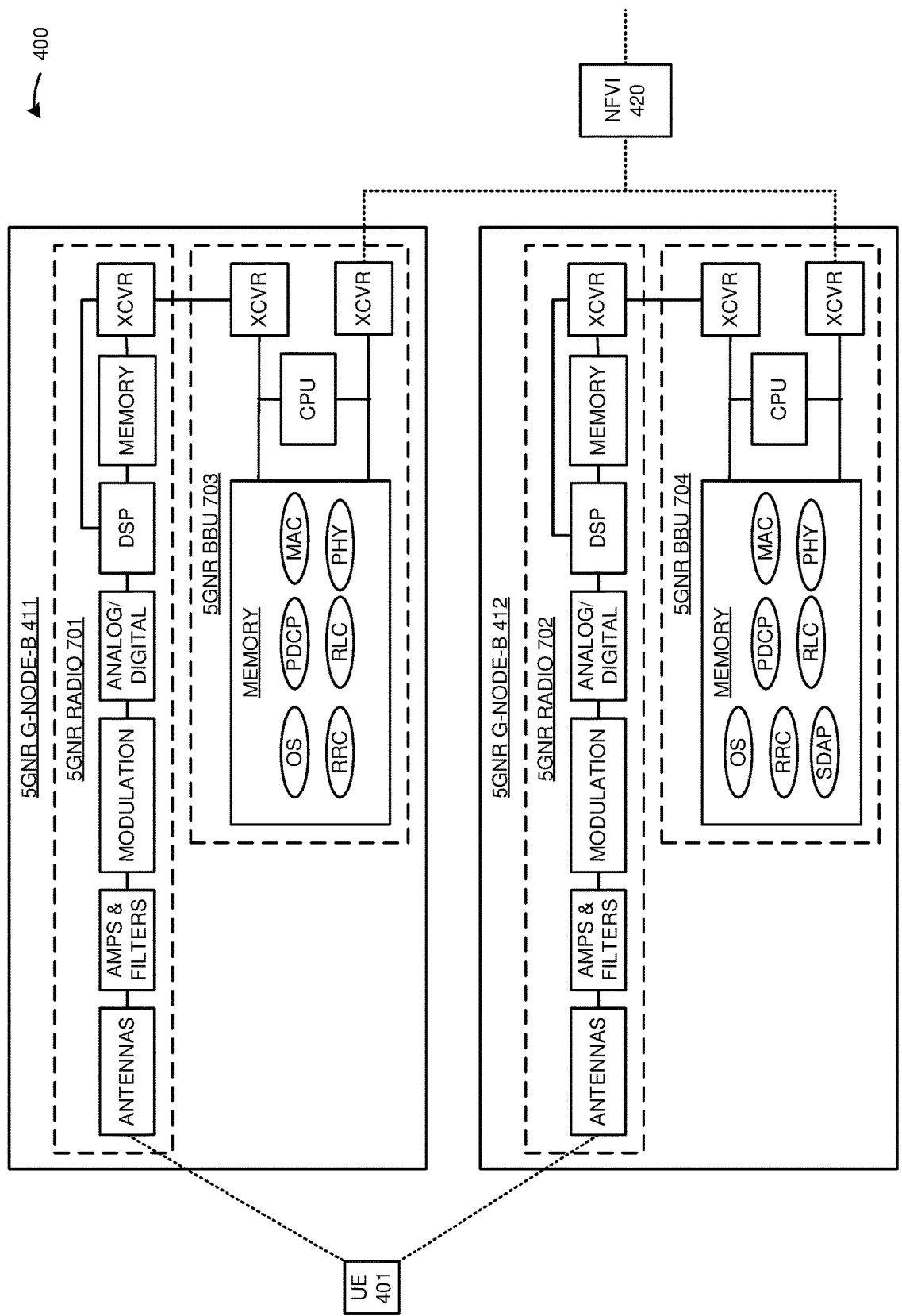
FIG. 7 illustrates 5GNR gNodeBs to serve the UEs over wireless 5GNR uplinks.

FIG. 7 illustrates 5GNR gNodeBs 411-412 to serve UE 401 over wireless 5GNR uplinks. 5GNR gNodeBs 411-424 comprise examples of wireless access nodes 111-112, although access nodes 111-112 may differ. 5GNR gNodeB 411 comprises 5GNR radio 701 and 5GNR BBU 703. 5GNR gNodeB 412 comprises 5GNR radio 702 and 5GNR BBU 704. 5GNR radios 701-702 comprise antennas, amplifiers, filters, modulation, analog-to-digital interfaces, DSP, memory, and transceivers that are coupled over bus circuitry. 5GNR BBUs 703-704 comprise memory, CPU, and transceivers that are coupled over bus circuitry. The memories in 5GNR BBUs 703-704 store operating systems and network applications like PHY, MAC, RLC, PDCP, SDAP, and RRC. The CPU in 5GNR BBUs 703-704 executes the operating systems, PHYs, MACs, RLCs, PDCPs, SDAPs, and RRCs to exchange: 5GNR signaling and user data with UE 401, N2 signaling with AMF 421 in NFVI 420, and N3 data for UE 401 with UPF 425 in NFVI 420. UE 401 is wirelessly coupled to the antennas in 5GNR radios 701-702 over 5GNR links. Transceivers in 5GNR radios 701-702 are coupled to transceivers in respective 5GNR BBUs 703-704 over CPRI links. Transceivers in 5GNR BBUs 503-504 are coupled to AMF 421 and UPF 425 in NFVI 420.

In 5GNR radios 501-502, the antennas receive wireless 5GNR signals from UE 401 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRCs process the UL 5GNR signaling and DL N2 signaling from AMF 421 to generate new UL N2 signaling and new DL 5GNR signaling. The 5GNR RRCs transfer the new UL N2 signaling to AMF 421 in NFVI 420. The 5GNR SDAPs transfer corresponding UL N3 data to UPF 425 over backhaul links.

In 5GNR BBUs 703-704, the 5GNR RRCs receive the DL N2 signaling from AMF 421 in NFVI 420. The 5GNR SDAPs receives DL N3 data from UPF 425. The 5GNR network applications process the new DL 5GNR signaling and the DL 5GNR data to generate corresponding DL 5GNR symbols that carry the DL 5GNR signaling and DL 5GNR data. In 5GNR radios 701-702, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals to UE 401 that transport the DL 5GNR signaling and DL 5GNR data.

RRC functions comprise authentication, security, handover control, status reporting, QoS, network broadcasts and pages, and network selection. SDAP functions include packet marking and QoS enforcement. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In operation, UE 401 wirelessly attaches to 5GNR BBU 703 over radio 701. 5GNR BBU 703 transfers N2 signaling for UE 401 to 5GC AMF 421. 5GNR BBU 703 receives N2 signaling from AMF 421 that indicates service IDs, QoS, network addresses, and the like. 5GNR BBU 703 transfers the service IDs, QoS, network addresses, and the like to UE 401 over radio 701. UE 401 reports the signal strength of 5GNR gNodeB 412 to 5GNR BBU 703 over radio 701, and in response to the N2 signaling from AMF 421 and the signal strength, 5GNR BBU 703 directs UE 401 to attach to 5GNR gNodeB 412. 5GNR BBUs 703-704 transfer N2 signaling for UE 401 to 5GC AMF 421 indicating the attachment. 5GC AMF 421 signals 5GC SMF 424 of the attachment, and in response, SMF 424 directs UPF 425 to serve UE 401 over 5GNR gNodeB 412. UE 401 exchanges user data with external systems over 5GNR gNodeBs 411-412 and UPF 425. 5GNR gNodeBs 411-412 use different frequency bands that have different characteristics like channel sizes, power levels, and spectral efficiencies.

5GNR gNodeB 411 serves other UEs and has an uplink usage that comprises the amount of these UEs (plus UE 401), their uplink data, uplink interference, and/or the like for gNodeB 411. 5GNR BBU 703 determines its frequency band characteristics and uplink usage. 5GNR gNodeB 412 serves other UEs and has its own an uplink usage. 5GNR BBU 704 determines its frequency band characteristics and uplink usage. UE 401 determines its power headroom for 5GNR gNodeB 411 and its power headroom for 5GNR gNodeB 412. UE 401 transfers its power headroom for 5GNR NodeB 411 to BBU 703. UE 401 transfers its power headroom for 5GNR NodeB 412 to BBU 704. 5GNR BBU 704 transfers its power headroom for UE 401 to 5GNR BBU 703. 5GNR BBU 704 also transfers its uplink usage and frequency characteristics to 5GNR BBU 703. 5GNR BBU 703 compares the power headroom for UE 401 and gNodeB 411 to the power headroom for UE 401 and gNodeB 412. 5GNR BBU 703 compares the uplink usage and frequency characteristics for gNodeB 411 to the uplink usage and frequency characteristics for 5GNR gNodeB 412.

Based on the comparisons, 5GNR gNodeB 411 determines a first amount of uplink data units for UE 401 over gNodeB 411 and a second amount of uplink data units for the UE 401 over gNodeB 412. 5GNR gNodeB 411 applies the percentages to the total number of data units that are required to serve UE 401 per the selected services and QoS over the time interval to determine the number of uplink data units for gNodeB 411 during the time interval and the number of uplink data units for gNodeB 412 during the time interval. 5GNR BBU 703 transfers the number of uplink data units for UE 401 during the time interval to BBU 704. 5GNR BBU 703 grants uplink resources to UE 401 based on its number of uplink data units. 5GNR BBU 704 grants uplink resources to UE 401 based on its number of uplink data units. UE 401 exchanges user data with external systems over 5GNR gNodeBs 411-412 and UPF 425. Advantageously, UE 401 transfers uplink data per a split based on comparative power headroom, uplink usage, and frequency band.

Figure 8:
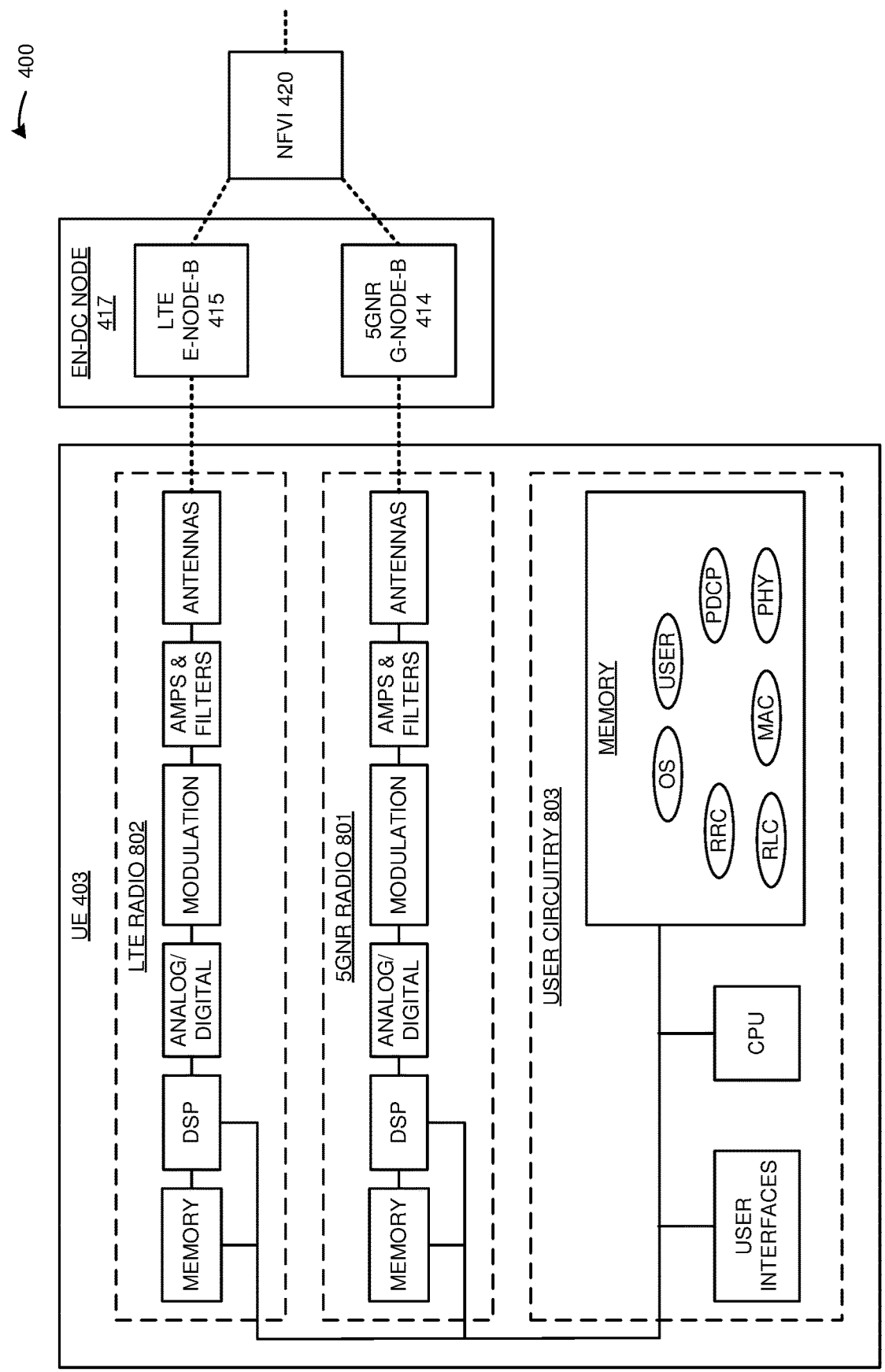
FIG. 8 illustrates a UE that is served over a wireless 5GNR uplink and a wireless LTE uplink.

FIG. 8 illustrates UE 403 that is served over wireless 5GNR uplinks and wireless LTE uplinks. UE 403 comprises 5GNR radio 801, LTE radio 802, and user circuitry 803 that are coupled over bus circuitry. Radios 801-802 comprise antennas, amplifiers, filters, modulation, analog-to-digital interfaces, DSP, and memory that are coupled over bus circuitry. User circuitry 803 comprises user interfaces, CPU, and memory that are coupled over bus circuitry. UE 403 is an example of UE 110, although UE 110 may differ.

The antennas in radios 801-802 are wirelessly coupled to NodeBs 414-415 in EN-DC node 417. The user interfaces in user circuitry 803 comprise graphic displays, machine controllers, sensors, cameras, transceivers, and/or some other user components. The memory in user circuitry 803 stores an operating system, user applications (USER), and network applications (PHY, MAC, RLC, PDCP, and RRC). The CPU in user circuitry 803 executes the operating system and the user applications to generate and consume user data. The CPU in user circuitry 803 executes the operating system and the network applications to wirelessly exchange corresponding network signaling and user data with NodeBs 414-415 over radios 801-802.

In 5GNR radios 801-802, the antennas receive wireless signals from NodeBs 414-415 that transport DL network signaling and DL user data. The antennas transfer corresponding electrical DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL symbols from the DL digital signals. The CPUs execute the network applications to process the DL symbols and recover the DL network signaling and the DL user data. The RRCs process the DL network signaling and user signaling from the operating system to generate new UL network signaling and new DL user signaling. The network applications process the new UL network signaling and the UL user data to generate corresponding UL symbols that carry the UL network signaling and UL user data. In radios 801-802, the DSPs process the UL symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless signals to NodeBs 414-415 that transport the UL network signaling and UL user data.

In operation, the LTE RRC in user circuitry 803 wirelessly attaches to LTE eNodeB 415 in EN-DC node 417 over LTE radio 802 and indicates its 5GNR capability. The LTE RRC in user circuitry 803 receives the service IDs, QoS, network addresses, 5GNR instructions, and the like. In response to the 5GNR instructions, the LTE RRC directs the 5GNR network applications measure and report the signal strength of 5GNR gNodeB 414. The LTE RRC reports the signal strength of 5GNR gNodeB 414 to LTE eNodeB 415 over LTE radio 802. LTE eNodeB 415 directs the LTE RRC in user circuitry 803 to attach UE 403 to 5GNR gNodeB 414. In user circuitry 803, the LTE RRC directs the 5GNR PDCP to attach UE 403 to 5GNR gNodeB 414. UE 403 attaches to 5GNR gNodeB 414. In user circuitry 803, the LTE PDCP and the 5GNR PDCP exchange user data with the user applications. The 5GNR PDCP exchanges the user data with 5GNR gNodeB 414 over 5GNR radio 801. The LTE PDCP exchanges the user data with LTE eNodeB 415 over LTE radio 802.

The LTE MAC in user circuitry 803 determines LTE power headroom for LTE eNodeB 415 and reports the headroom to the LTE PDCP. The 5GNR MAC in user circuitry 803 determines 5GNR power headroom for 5GNR gNodeB 414 and reports the headroom to the LTE PDCP over the 5GNR PDCP and LTE RRC. The LTE PDCP in user circuitry 803 receives LTE uplink grants from LTE eNodeB 415 and transfers uplink LTE data and LTE signaling per the grants. The 5GNR PDCP in user circuitry 803 receives 5GNR uplink grants from 5GNR gNodeB 414 and transfers uplink 5GNR data and 5GNR signaling per the grants. Advantageously, UE 403 transfers the uplink data per a split based comparative power headroom, uplink usage, and frequency band characteristics.

Note that UE 401 may be adapted from UE 403 by removing LTE radio 802 and adding another 5GNR radio like radio 801 and by removing the LTE network applications and adding 5GNR network applications for the other 5GNR radio. In a similar manner, UE 402 may be adapted from UE 403 by adding 5GNR network applications for RRC and SDAP. UEs 401-402 are examples of UEs 111-112, although UEs 111-112 may differ.

Figure 9:
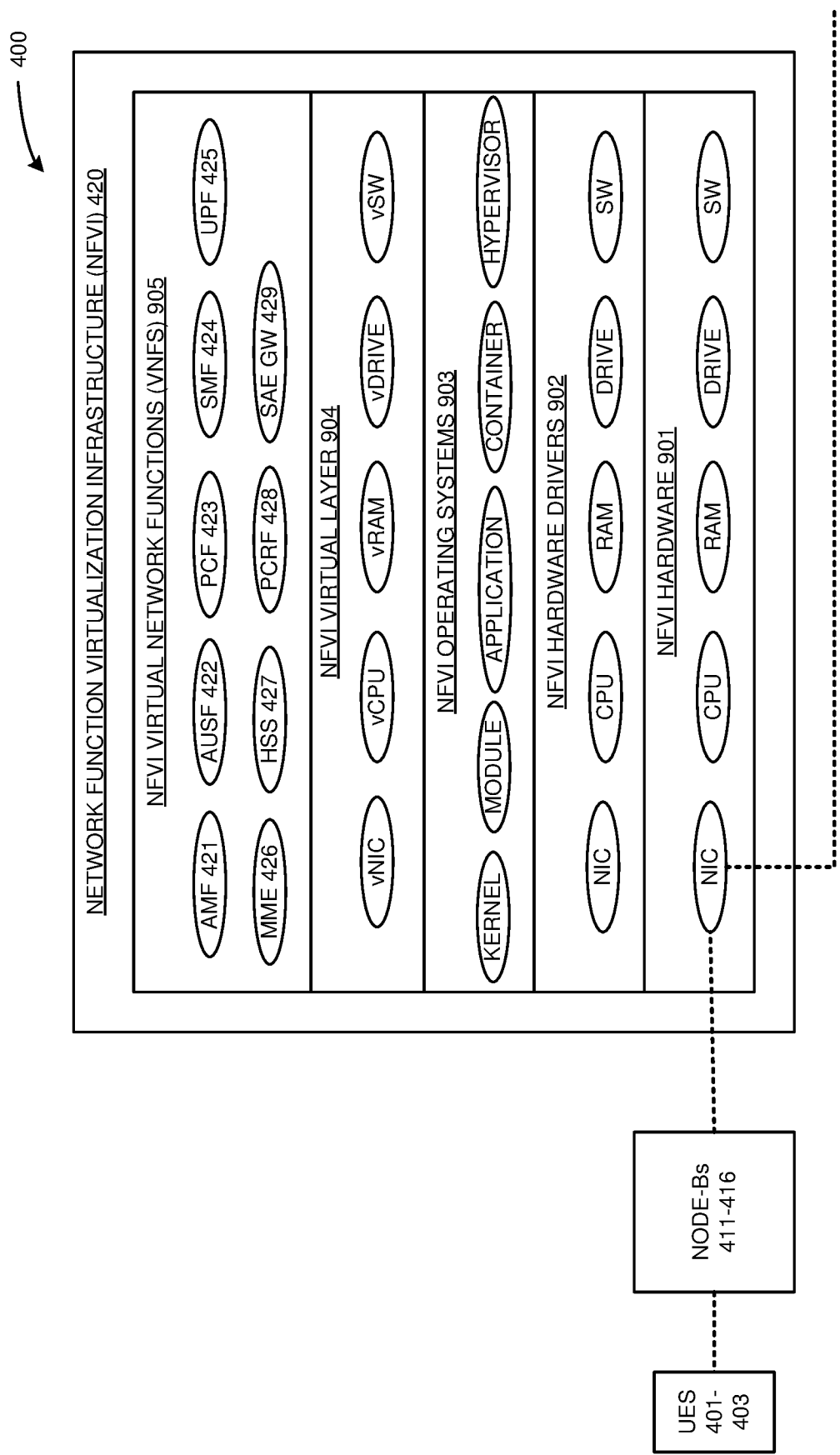
FIG. 9 illustrates a Network Function Virtualization Infrastructure (NFVI) to serve UEs over wireless 5GNR uplinks and LTE uplinks.

FIG. 9 illustrates Network Function Virtualization Infrastructure (NFVI) 420 to serve UEs 401-403 over wireless 5GNR uplinks and LTE uplinks. NFVI 420 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NIC), CPU, RAM, flash/disk drives, and data switches (SW). NFVI hardware drivers 902 comprise software that is resident in the NIC, CPU, RAM, DRIVE, and SW. NFVI operating systems 903 comprise kernels, modules, applications, containers, hypervisors, and the like. NFVI virtual layer 904 comprises virtual NICs (vNIC), virtual CPUs (vCPU), virtual RAM (vRAM), virtual Drives (vDRIVE), and virtual Switches (vSW). NFVI VNFs 905 comprise AMF 421, AUSF 422, PCF 423, SMF 424, UPF 425, MME 426, HSS 427, PCRF 428, and SAE GW 429. Other LTE VNFs and 5GC VNFs are typically present but are omitted for clarity. The NIC are coupled to NodeBs 411-416 and to external systems. NFVI hardware 401 executes NFVI hardware drivers 402, NFVI operating systems 403, NFVI virtual layer 404, and NFVI VNFs 405 to serve UEs 401-403 over NodeBs 411-416.

In a first operation, AMF 421 receives N2 signaling from 5GNR gNodeB 411 for UE 401. AMF 421 interacts with AUSF 422 and UE 401 to authenticate and authorize UE 401 for wireless data services. AMF 421 interacts with PCF 423 and SMF 424 to select services, QoS, network addresses, dual-connectivity instructions, and the like to serve UE 401 over 5GNR gNodeB 411. AMF 421 transfers the N2 signaling to 5GNR gNodeB 411 that indicates service IDs, QoS, network addresses, dual-connectivity instruction, and the like. SMF 424 signals the service IDs, QoS, network addresses to UPF 425. AMF 421 receives signaling for UE 401 indicating the 5GNR attachment to gNodeB 412. AMF 421 signals 5GC SMF 424 of the 5GNR attachment, and in response, SMF 424 directs UPF 425 to serve UE 401 over 5GNR gNodeB 412. UE 401 exchanges user data with external systems over 5GNR gNodeBs 411-412 and UPF 425.

In a second operation, AMF 421 receives N2 signaling from 5GNR gNodeB 413 for UE 402. AMF 421 interacts with AUSF 422 and UE 401 to authenticate and authorize UE 402 for wireless data services. AMF 421 interacts with PCF 423 and SMF 424 to select services, QoS, network addresses, dual-connectivity instructions, and the like to serve UE 402 over 5GNR gNodeB 413. AMF 421 transfers the N2 signaling to 5GNR gNodeB 41 that indicates service IDs, QoS, network addresses, dual-connectivity instructions, and the like. SMF 424 signals the service IDs, QoS, network addresses to UPF 425. AMF 421 receives signaling from 5GNR gNodeB 413 for UE 402 indicating the LTE attachment to eNodeB 416. AMF 421 signals SMF 424 which drives UPF 425 to serve UE 402 over LTE eNodeB 416. UE 402 exchanges user data with external systems over 5GNR gNodeB 413, LTE eNodeB 416, and UPF 425.

In a third operation, MME 426 receives S1-MME signaling for UE 403 indicating its 5GNR capability. MME 426 interacts with HSS 427 and UE 403 to authenticate and authorize UE 403 for wireless data services. MME 426 interacts with SAE GW 429 which interacts with PCRF 428 to select services, QoS, network addresses, 5GNR instructions, and the like to serve UE 403 over LTE eNodeB 415. MME 426 transfers S1-MME signaling to LTE eNodeB 415 that indicates service IDs, QoS, network addresses, 5GNR instructions, and the like. LTE MME 426 signals the service IDs, QoS, and network addresses to SAE GW 429. MME 426 receives S1-MME signaling indicating the 5GNR attachment of UE 403. MME 426 directs SAE GW 429 to serve UE 403 over 5GNR gNodeB 414. UE 403 exchanges user data with external systems over 5GNR gNodeB 414, LTE eNodeB 415, and SAE GW 429.

Figure 10:
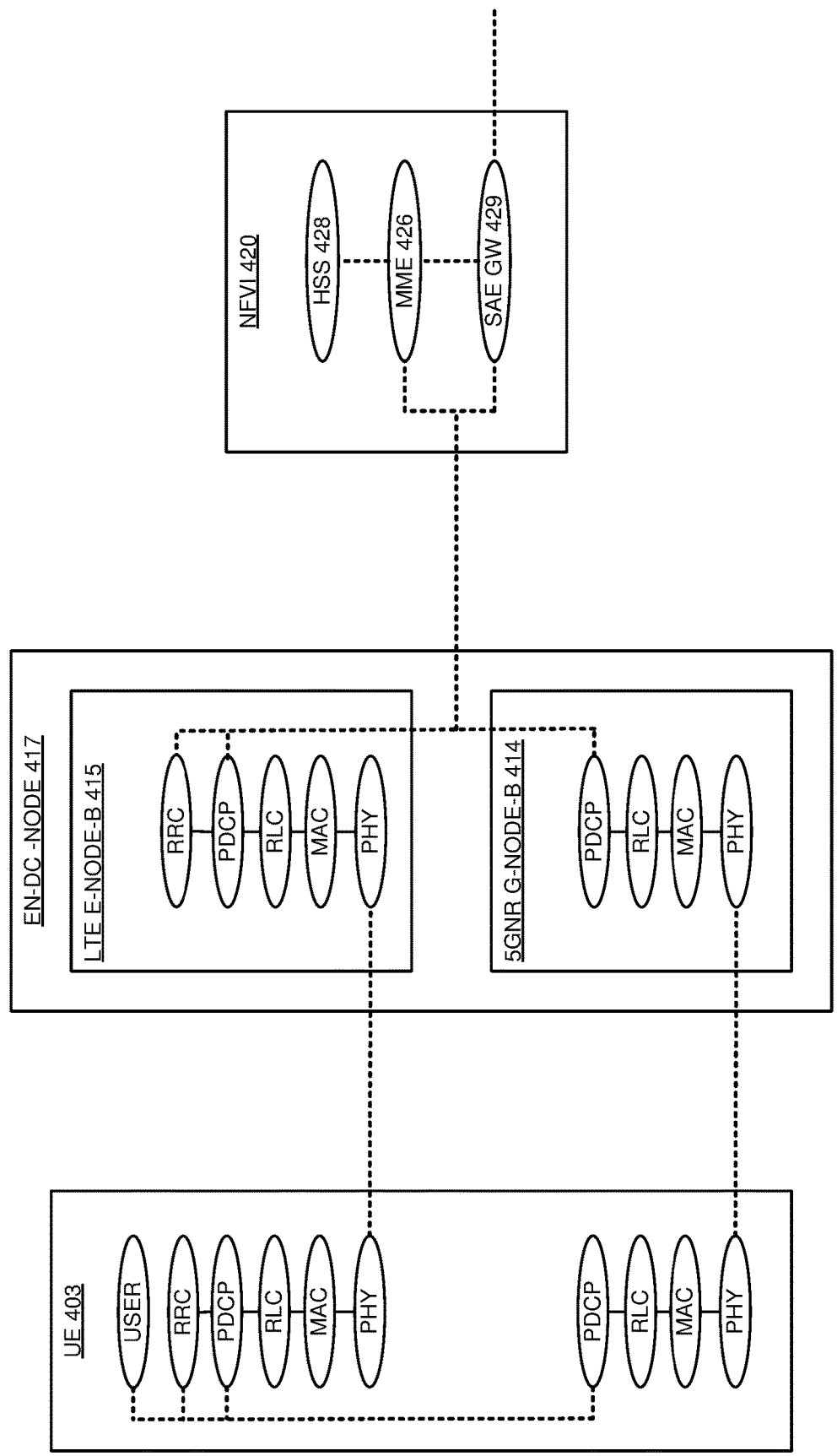
FIG. 10 illustrates an exemplary operation of the 5G wireless communication network to serve the UEs over the wireless 5GNR uplinks and the wireless LTE uplinks.

FIG. 10 illustrates an exemplary operation of 5G wireless communication network 400 to serve UE 403 over wireless 5GNR uplinks and wireless LTE uplinks. The user applications in UE 403 generate and consume user data. The operating system in UE 403 drives the LTE RRC to exchange the user data for the user applications. The RRC in UE 403 attaches to the RRC in LTE eNodeB 415 over their LTE PDCPs, RLCs, MACs, and PHYs. The LTE RRC in UE 403 indicates its 5GNR capability to the LTE RRC in LTE eNodeB 415. The LTE RRC in LTE eNodeB 415 transfers S1-MME signaling for UE 403 to MME 426 in NFVI 420 which indicates the 5GNR capability. MME 426 interacts with HSS 427 and UE 403 to authenticate and authorize UE 403 for wireless data services. MME 426 interacts with SAE GW 429 which interacts with PCRF 428 to select services, QoS, network addresses, 5GNR instructions, and the like to serve UE 403 over LTE eNodeB 415. LTE MME 426 transfers S1-MME signaling to the RRC in LTE eNodeB 415 that indicates service IDs, QoS, network addresses, 5GNR instructions, and the like. LTE MME 426 signals the service IDs, QoS, and network addresses to SAE GW 429. The RRC in LTE eNodeB 415 transfers the service IDs, QoS, network addresses, 5GNR instructions, and the like to the LTE RRC in UE 403 over their PDCPs, RLCs, MACs, and PHYs.

In response to the 5GNR instructions, the 5GNR PHY in UE 403 measures and reports the signal strength of 5GNR gNodeB 414 to the LTE RRC which reports the signal strength to the RRC in LTE eNodeB 415. In response to the S1-MME signaling from MME 426, and the reported signal strength, the RRC in LTE eNodeB 415 directs the RRC in UE 403 to attach UE 403 to 5GNR gNodeB 414. The LTE RRC in UE 403 directs the 5GNR PDCP to attach to 5GNR gNodeB 414. The 5GNR PDCP in UE 403 attaches to the 5GNR PDCP in 5GNR gNodeB 414 over their 5GNR RLCs, MACs, and PHYs. The PDCP in gNodeB 414 transfers X2 signaling to the RRC in LTE eNodeB 415 indicating the attachment of UE 403. The RRC in LTE eNodeB 415 transfers S1-MME signaling to MME 426 indicating the 5GNR attachment of UE 403. MME 426 directs SAE GW 429 to serve UE 403 over 5GNR gNodeB 414. The LTE PDCP in UE 403 exchanges user data with external systems over LTE eNodeB 415 and SAE GW 429. The 5GNR PDCP in UE 403 exchanges user data with external systems over 5GNR gNodeB 414 and SAE GW 429. LTE eNodeB 415 and 5GNR gNodeB 414 use different frequency bands that have different characteristics like channel size, power level, and spectral efficiency.

LTE eNodeB 415 serves other UEs and has an uplink usage that comprises the amount of these UEs (plus UE 403), their uplink data, uplink interference, and/or the like for eNodeB 415. The RRC in LTE eNodeB 415 determines its frequency bands characteristics and uplink usage. 5GNR gNodeB 414 serves other UEs and has its own an uplink usage. The PDCP in 5GNR gNodeB 414 determines its frequency band characteristics and uplink usage. The LTE MAC in UE 403 determines its power headroom for LTE eNodeB 415 and reports the LTE power headroom to the LTE PDCP. The PDCP MAC in UE 403 determines its power headroom for 5GNR gNodeB 414 and reports the 5GNR power headroom to the 5GNR PDCP which forwards the headroom data to the LTE PDCP over the LTE RRC. The 5GNR PDCP in gNodeB 414 also transfers its uplink usage and frequency characteristics to the PDCP in LTE eNodeB 415.

The PDCP in LTE eNodeB 415 compares the power headroom for UE 403 and gNodeB 414 to the power headroom for UE 403 and eNodeB 415. The PDCP in LTE eNodeB 415 compares the uplink usage and frequency characteristics for LTE eNodeB 415 to the uplink usage and frequency characteristics for 5GNR gNodeB 414. Based on the comparisons, the PDCP in LTE eNodeB 415 determines a first amount of uplink data units for UE 403 over LTE eNodeB 415 and a second amount of uplink data units for the UE 403 over 5GNR gNodeB 414. The PDCP in LTE eNodeB 415 transfers the number of uplink data units during the time interval for UE 403 and gNodeB 415 to the PDCP in gNodeB 414. In LTE eNodeB 415, the LTE PDCP grants uplink data units for UE 403 to the LTE RLC based on its allocated LTE uplink grant amount. In 5GNR gNodeB 414, the 5GNR PDCP grants uplink data units for UE 403 to the 5GNR RLC based on its allocated LTE uplink amount. UE 403 exchanges user data with external systems over 5GNR gNodeB 414, LTE eNodeB 415, and SAE GW 429. Advantageously, UE 403 transfers the uplink data per a split based comparative power headroom, uplink usage, and frequency band characteristics.

Figure 11:
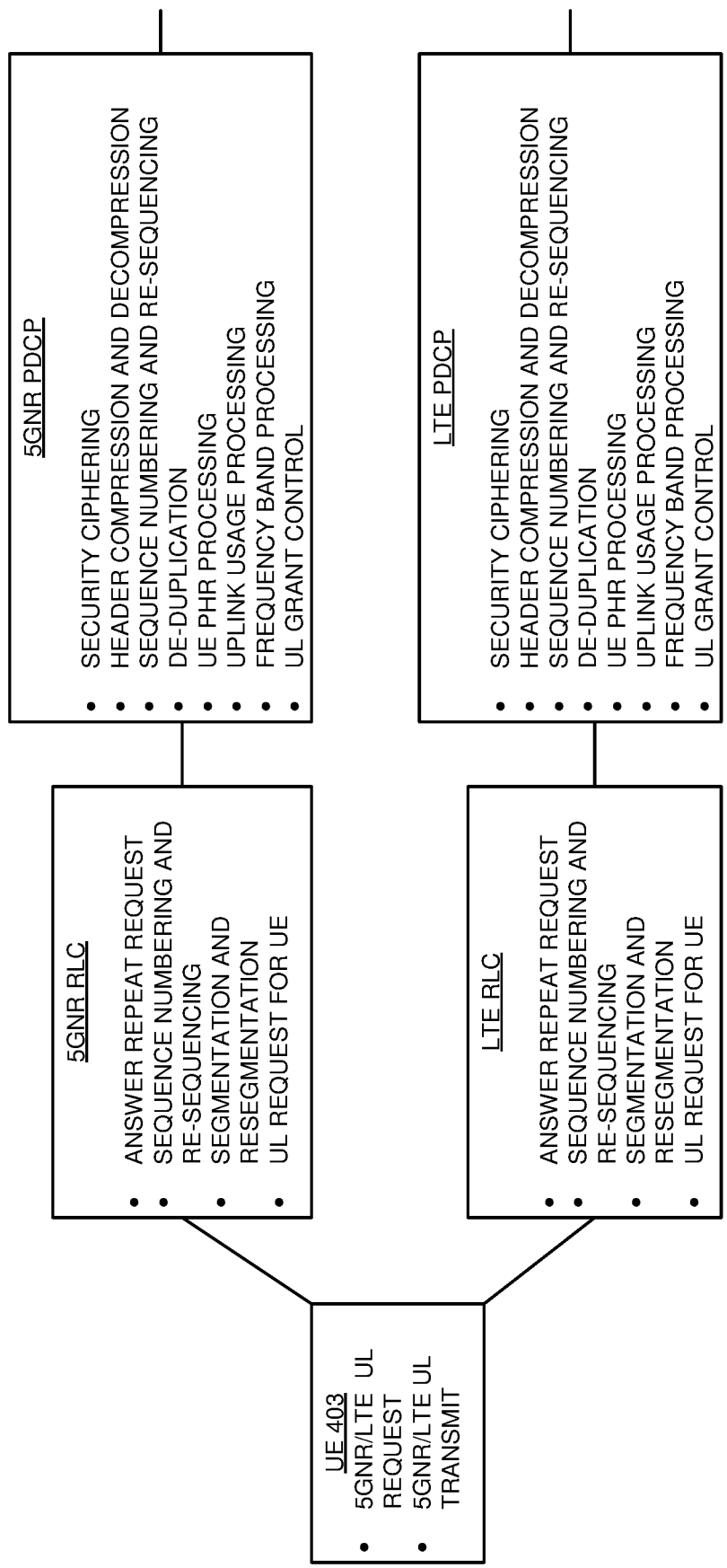
FIG. 11 illustrates Packet Data Convergence Protocols (PDCPs) to serve UEs over the wireless 5GNR uplinks and the wireless LTE uplinks.

FIG. 11 illustrates Packet Data Convergence Protocols (PDCPs) to serve UE 403 over wireless 5GNR uplinks and wireless LTE uplinks. UE 403 is coupled to the 5GNR RLC over the 5GNR radios, PHYs, and MACs. UE 403 is coupled to the LTE RLC over the LTE radios, PHYs, and MACs. The 5GNR RLC is coupled to the 5GNR PDCP, and the LTE RLC is coupled to the LTE PDCP. The 5GNR PDCP and the LTE PDCPs are coupled to SAE GW 429. RLC functions comprise Answer Repeat Request (ARQ), sequence numbering/resequencing, segmentation/resegmentation, and UL requests for UE 403. PDCP functions comprise security ciphering, header compression/decompression, sequence numbering/re-sequencing, de-duplication, UE Power Headroom (PHR) processing, UL usage processing, frequency band processing, and UL grant control.

In operation, the 5GNR PDCP transfers its power headroom data, uplink usage, and frequency band characteristics to the LTE PDCP. The LTE PDCP determines the number of UL 5GNR data units and the a number of UL LTE data units during a time interval for UE 403 based on the power headroom data, UL usage, and frequency bands. The LTE PDCP signals the number of 5GNR data units during the time interval to the 5GNR PDCP. UE 403 makes UL requests to the LTE RLC over the LTE MAC and PHY. The LTE RLC make corresponding UL requests to the LTE PDCP. The LTE PDCP grants the UL LTE requests based on the number of LTE data units allocated for the time interval. UE 403 makes UL requests to the 5GNR RLC over the 5GNR MAC and PHY. The 5GNR RLC makes corresponding UL requests to the 5GNR PDCP. The 5GNR PDCP grants the UL 5GNR requests based on the number of 5GNR data units allocated for the time interval.

Figure 12:
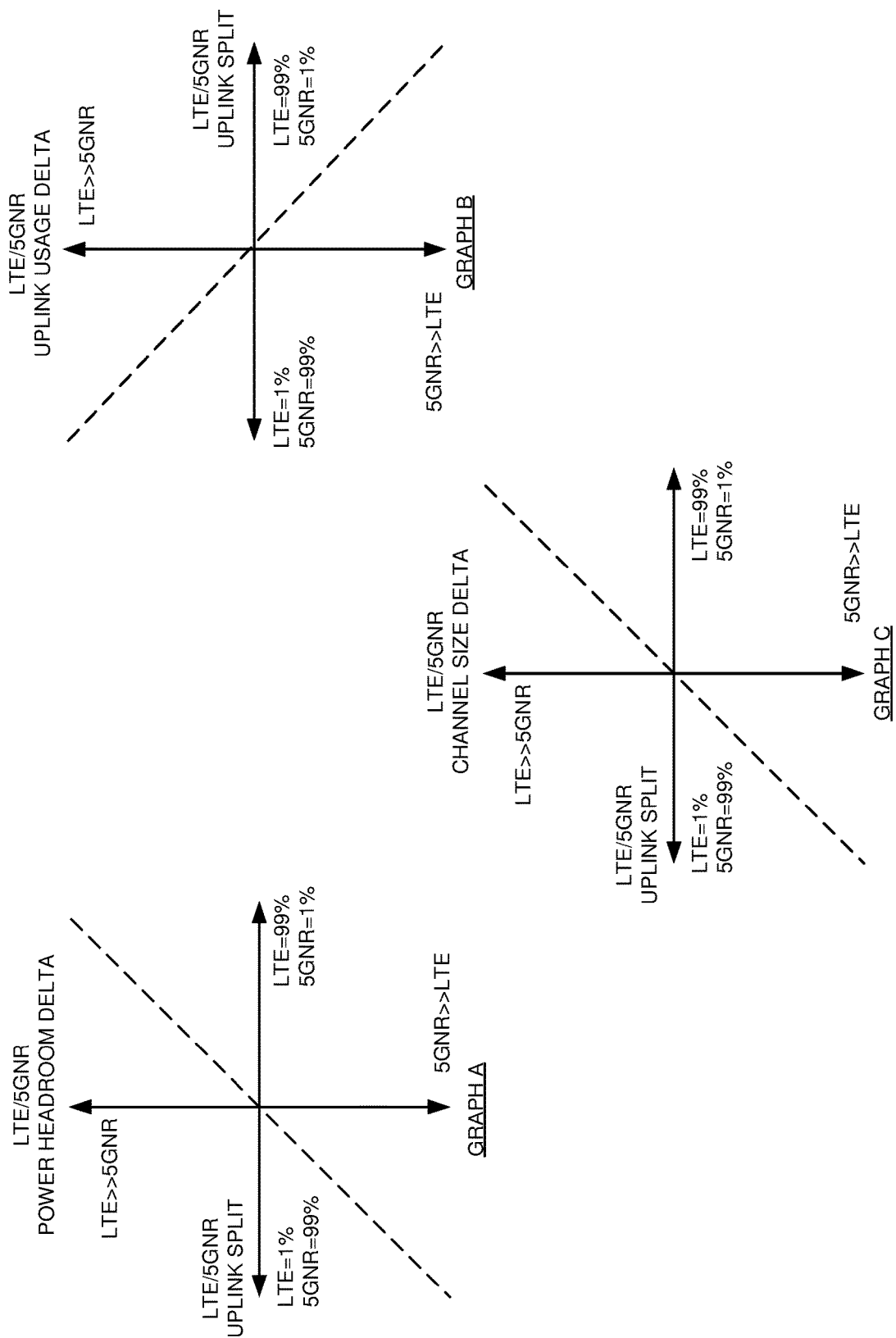
FIG. 12 illustrates uplink splits for UEs over the wireless uplinks based on power headroom, uplink usage, and frequency band channel size.

FIG. 12 illustrates uplink splits for UE 402 over the wireless uplinks based on power headroom, uplink usage, and frequency band channel size. On graph A, the vertical axis represents LTE/5GNR power headroom difference. The horizontal axis represents LTE/5GNR split. As the LTE power headroom increases relative to the 5GNR power headroom, the LTE split increases relative to the 5GNR split. As the 5GNR power headroom increases relative to LTE power headroom, the 5GNR split increases relative to the LTE split. On graph B, the vertical axis represents LTE/

5GNR uplink usage difference. The horizontal axis represents LTE/5GNR split. As the LTE uplink usage increases relative to the 5GNR uplink usage, the LTE split decreases relative to the 5GNR split. As the 5GNR uplink usage increases relative to the LTE uplink usage, the 5GNR split decreases relative to the LTE split. On graph C, the vertical axis represents LTE/5GNR channel size difference. The horizontal axis represents the LTE/5GNR split. As the LTE channel size increases relative to the 5GNR channel size, the LTE split increases relative to the 5GNR split. As the 5GNR channel size increases relative to the LTE channel size, the 5GNR split increases relative to the LTE split.

The wireless data network circuitry described above comprises computer hardware and software that form special-purpose network circuitry to serve wireless UEs over multiple wireless uplinks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs over multiple wireless uplinks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UE) over wireless uplinks, the method comprising:
   a primary wireless access node wirelessly receiving primary power headroom for the UE on the primary wireless access node;
   a secondary wireless access node wirelessly receiving secondary power headroom for the UE on the secondary wireless access node and transferring the secondary power headroom to the primary wireless access node;
   the primary wireless access node executing a Packet Data Convergence Protocol (PDCP) and the executing PDCP comparing the primary power headroom to the secondary power headroom, determining a primary uplink grant amount and a secondary uplink grant amount for the UE based on the power headroom comparison, and transferring the secondary uplink grant amount to the secondary wireless access node;
   the primary wireless access node granting primary uplink resources to the wireless UE based on the primary uplink grant amount and wirelessly receiving primary user data from the wireless UE using the primary uplink resources; and
   the secondary wireless access node granting secondary uplink resources to the wireless UE based on the secondary uplink grant amount and wirelessly receiving secondary user data from the wireless UE using the secondary uplink resources.

2. The method of claim 1 wherein the primary wireless access node comparing the primary power headroom to the secondary power headroom and determining the primary uplink grant amount and the secondary uplink grant amount comprises determining a power headroom difference between the primary power headroom and the secondary power headroom and determining the primary uplink grant amount and the secondary uplink grant amount based on the power headroom difference.

3. The method of claim 1 further comprising:
   the primary wireless access node determining primary uplink usage;
   the secondary wireless access node determining secondary uplink usage and transferring the secondary uplink usage to the primary node;
   the primary wireless access node comparing the primary uplink usage to the secondary uplink usage; and wherein
   the primary wireless access node determining the primary uplink grant amount and the secondary uplink grant amount comprises determining the primary uplink grant amount and the secondary uplink grant amount based on the power headroom comparison and the uplink usage comparison.

4. The method of claim 1 wherein:
   the primary wireless access node wirelessly receiving the primary user data from the UE using the primary uplink resources comprises using a primary frequency band;
   the secondary wireless access node wirelessly receiving the secondary user data from the UE using the secondary uplink resources comprises using a secondary frequency band; and further comprising
   the primary wireless access node comparing primary frequency band data to secondary frequency band data; and wherein
   the primary wireless access node determining the primary uplink grant amount and the secondary uplink grant amount comprises determining the primary uplink grant amount and the secondary uplink grant amount based on the power headroom comparison and the frequency band comparison.

5. The method of claim 1, further comprising the primary wireless access node translating the difference between the primary power headroom and the secondary power headroom into the primary uplink grant amount and the secondary uplink grant amount using a data structure.

6. The method of claim 1 wherein the PDCP is a Fifth Generation New Radio (5GNR) PDCP.

7. The method of claim 1 wherein the PDCP is a Long Term Evolution (LTE) PDCP.

8. The method of claim 1 wherein the primary wireless access node comprises an Evolved Universal Terrestrial Radio Access Network New Radio Dual Connectivity (EN-DC) node.

9. The method of claim 1 wherein the primary wireless access node comprises a Fifth Generation New Radio (5GNR) gNodeB.

10. The method of claim 1 wherein the primary wireless access node comprises a Long Termination Evolution (LTE) eNodeB.

11. A wireless communication network to serve User Equipment (UE) over wireless uplinks, the wireless communication network comprising:
a primary wireless access node configured to wirelessly receive primary power headroom for the UE on the primary wireless access node;
a secondary wireless access node configured to wirelessly receive secondary power headroom for the UE on the secondary wireless access node and transfer the secondary power headroom to the primary wireless access node;
the primary wireless access node configured to execute a Packet Data Convergence Protocol (PDCP) and the executing PDCP configured to compare the primary power headroom to the secondary power headroom, determine a primary uplink grant amount and a secondary uplink grant amount for the UE based on the power headroom comparison, and transfer the secondary uplink grant amount to the secondary wireless access node;
the primary wireless access node configured to grant primary uplink resources to the wireless UE based on the primary uplink grant amount and wirelessly receive primary user data from the wireless UE using the primary uplink resources; and
the secondary wireless access node configured to grant secondary uplink resources to the wireless UE based on the secondary uplink grant amount and wirelessly receive secondary user data from the wireless UE using the secondary uplink resources.

12. The wireless communication network of claim 11 wherein the primary wireless access node is configured to determine a power headroom difference between the primary power headroom and the secondary power headroom and determine the primary uplink grant amount and the secondary uplink grant amount based on the power headroom difference.

13. The wireless communication network of claim 11 further comprising:
the primary wireless access node configured to determine primary uplink usage;
the secondary wireless access node configured to determine secondary uplink usage and transfer the secondary uplink usage to the primary node;
the primary wireless access node configured to compare the primary uplink usage to the secondary uplink usage; and wherein
the primary wireless access node is configured to determine the primary uplink grant amount and the secondary uplink grant amount based on the power headroom comparison and the uplink usage comparison.

14. The wireless communication network of claim 11 wherein:
the primary wireless access node is configured to use a primary frequency band;
the secondary wireless access node is configured to use a secondary frequency band; and further comprising
the primary wireless access node is configured to compare primary frequency band data to secondary frequency band data; and wherein
the primary wireless access node is configured to determine the primary uplink grant amount and the secondary uplink grant amount based on the power headroom comparison and the frequency band comparison.

15. The wireless communication network of claim 11 wherein the primary wireless access node is configured to translating the difference between the primary power headroom and the secondary power headroom into the primary uplink grant amount and the secondary uplink grant amount using a data structure.

16. The wireless communication network of claim 11 wherein the PDCP is a Fifth Generation New Radio (5GNR) PDCP.

17. The wireless communication network of claim 11 wherein the PDCP is a Long Term Evolution (LTE) (PDCP).

18. The wireless communication network of claim 11 wherein the primary wireless access node comprises an Evolved Universal Terrestrial Radio Access Network New Radio Dual Connectivity (EN-DC) node.

19. The wireless communication network of claim 11 wherein the primary wireless access node comprises a Fifth Generation New Radio (5GNR) gNodeB.

20. The wireless communication network of claim 11 wherein the primary wireless access node comprises a Long Termination Evolution (LTE) eNodeB.

* * * * *